(12) United States Patent
Kumai

(10) Patent No.: US 10,877,363 B2
(45) Date of Patent: Dec. 29, 2020

(54) DISPLAY DEVICE AND REFLECTIVE POLARIZING ELEMENT

(71) Applicant: SEIKO EPSON CORPORATION, Tokyo (JP)

(72) Inventor: Yoshitomo Kumai, Okaya (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/716,953

(22) Filed: Dec. 17, 2019

(65) Prior Publication Data

US 2020/0192209 A1 Jun. 18, 2020

(30) Foreign Application Priority Data

Dec. 18, 2018 (JP) ................. 2018-236087

(51) Int. Cl.

| G03B 21/20 | (2006.01) |
|---|---|
| F21V 8/00 | (2006.01) |
| G02B 5/30 | (2006.01) |
| G03B 21/00 | (2006.01) |

(52) U.S. Cl.
CPC ....... *G03B 21/2073* (2013.01); *G02B 5/3025* (2013.01); *G02B 6/0008* (2013.01); *G03B 21/006* (2013.01); *G03B 21/204* (2013.01); *G02F 2203/07* (2013.01)

(58) Field of Classification Search
CPC .............. G03B 21/2073; G03B 5/3025; G03B 6/0008; G03B 21/006; G03B 21/204
USPC ......................................................... 362/19
See application file for complete search history.

(56) References Cited

U.S. PATENT DOCUMENTS

| 6,122,103 A | * | 9/2000 | Perkins | ................ | G02B 5/3058 |
|---|---|---|---|---|---|
| | | | | | 359/485.03 |
| 6,981,791 B2 | * | 1/2006 | Higashiyama | ....... | G02B 6/0038 |
| | | | | | 349/61 |
| 2006/0119937 A1 | * | 6/2006 | Perkins | ................ | G02B 5/3058 |
| | | | | | 359/485.03 |
| 2007/0147020 A1 | * | 6/2007 | Boyd | ................... | G02B 6/0055 |
| | | | | | 362/19 |

(Continued)

FOREIGN PATENT DOCUMENTS

| JP | 2003-502708 A | 1/2003 |
|---|---|---|
| JP | 2008-523422 A | 7/2008 |

(Continued)

*Primary Examiner* — Bryon T Gyllstrom
(74) *Attorney, Agent, or Firm* — Oliff PLC

(57) ABSTRACT

A display device includes a light source unit, light guide on which light from the light source unit is incident, liquid crystal panel modulating emitted light, and reflective polarizing element between the light guide and liquid crystal panel. The element includes a reflective metal portion extending in one direction and reflection enhancing portion on an end portion in the metal portion thickness direction. Light is incident on the element from an opposite side from the metal portion with respect to the reflection enhancing portion. The reflection enhancing portion includes a low refractive index film to overlap with the metal portion end portion and a high refractive index film on an opposite side of the low refractive index film from the metal portion. The high refractive index film thickness is set to an appropriate thickness corresponding to the metal portion thickness and width, and the low refractive index film thickness.

9 Claims, 27 Drawing Sheets

(56) References Cited

U.S. PATENT DOCUMENTS

| | | | |
|---|---|---|---|
| 2007/0153162 A1* | 7/2007 | Wright | G02F 1/133536 |
| | | | 349/96 |
| 2007/0217008 A1* | 9/2007 | Wang | G02B 5/1809 |
| | | | 359/485.05 |
| 2012/0075830 A1* | 3/2012 | Lee | G02B 5/3058 |
| | | | 362/19 |
| 2012/0249969 A1 | 10/2012 | Ishimatsu | |
| 2012/0257168 A1 | 10/2012 | Ishimatsu | |
| 2014/0240828 A1* | 8/2014 | Robinson | G02B 30/25 |
| | | | 359/465 |

FOREIGN PATENT DOCUMENTS

| | | |
|---|---|---|
| JP | 2008-536266 A | 9/2008 |
| JP | 2011-138627 A | 7/2011 |
| JP | 2012-027221 A | 2/2012 |
| JP | 2012-203329 A | 10/2012 |
| JP | 2012-220702 A | 11/2012 |
| JP | 2013-250322 A | 12/2013 |
| WO | 2006/104907 A1 | 10/2006 |

* cited by examiner

Al H=50nm W=40nm

| SiO2 ta (nm) | TiO2 tb (nm) | | | | | | | | | |
|---|---|---|---|---|---|---|---|---|---|---|
| | 0 | 20 | 40 | 60 | 80 | 100 | 120 | 140 | 160 | 180 |
| 20 | 0.670 | 0.539 | 0.600 | 0.736 | 0.801 | 0.818 | 0.790 | 0.693 | 0.609 | 0.643 |
| 40 | 0.650 | 0.596 | 0.717 | 0.808 | 0.843 | 0.842 | 0.792 | 0.690 | 0.661 | |
| 60 | 0.634 | 0.667 | 0.785 | 0.845 | 0.864 | 0.849 | 0.778 | 0.689 | | |
| 80 | 0.629 | 0.723 | 0.822 | 0.864 | 0.871 | 0.837 | 0.743 | | | |
| 100 | 0.638 | 0.760 | 0.839 | 0.858 | 0.858 | 0.797 | | | | |
| 120 | 0.656 | 0.778 | 0.839 | 0.850 | 0.816 | | | | | |
| 140 | 0.677 | 0.779 | 0.816 | 0.800 | | | | | | |
| 160 | 0.695 | 0.759 | 0.758 | | | | | | | |
| 180 | 0.707 | 0.716 | | | | | | | | |
| 200 | 0.710 | | | | | | | | | |

Al H=100nm W=40nm

| SiO2 ta (nm) | TiO2 tb (nm) | | | | | | | | | |
|---|---|---|---|---|---|---|---|---|---|---|
| | 0 | 20 | 40 | 60 | 80 | 100 | 120 | 140 | 160 | 180 |
| 20 | 0.756 | 0.668 | 0.711 | 0.810 | 0.862 | 0.878 | 0.859 | 0.791 | 0.725 | 0.736 |
| 40 | 0.744 | 0.715 | 0.802 | 0.868 | 0.895 | 0.894 | 0.858 | 0.784 | 0.755 | |
| 60 | 0.737 | 0.770 | 0.853 | 0.896 | 0.906 | 0.891 | 0.839 | 0.775 | | |
| 80 | 0.739 | 0.812 | 0.879 | 0.904 | 0.901 | 0.872 | 0.806 | | | |
| 100 | 0.749 | 0.837 | 0.885 | 0.895 | 0.880 | 0.834 | | | | |
| 120 | 0.765 | 0.845 | 0.876 | 0.872 | 0.841 | | | | | |
| 140 | 0.781 | 0.839 | 0.851 | 0.831 | | | | | | |
| 160 | 0.792 | 0.820 | 0.801 | | | | | | | |
| 180 | 0.796 | 0.786 | | | | | | | | |
| 200 | 0.793 | | | | | | | | | |

Al H=150nm W=40nm

| SiO2 ta (nm) | TiO2 tb (nm) | | | | | | | | | |
|---|---|---|---|---|---|---|---|---|---|---|
| | 0 | 20 | 40 | 60 | 80 | 100 | 120 | 140 | 160 | 180 |
| 20 | 0.754 | 0.687 | 0.731 | 0.823 | 0.865 | 0.869 | 0.842 | 0.773 | 0.710 | |
| 40 | 0.749 | 0.733 | 0.813 | 0.868 | 0.882 | 0.870 | 0.830 | 0.761 | | |
| 60 | 0.746 | 0.781 | 0.852 | 0.880 | 0.878 | 0.855 | 0.806 | | | |
| 80 | 0.750 | 0.813 | 0.863 | 0.873 | 0.861 | 0.830 | | | | |
| 100 | 0.759 | 0.827 | 0.858 | 0.856 | 0.836 | | | | | |
| 120 | 0.770 | 0.826 | 0.841 | 0.831 | | | | | | |
| 140 | 0.779 | 0.815 | 0.817 | | | | | | | |
| 160 | 0.784 | 0.795 | | | | | | | | |
| 180 | 0.783 | | | | | | | | | |
| 200 | | | | | | | | | | |

Al H=200nm W=40nm

| SiO2 ta (nm) | TiO2 tb (nm) | | | | | | | | | |
|---|---|---|---|---|---|---|---|---|---|---|
| | 0 | 20 | 40 | 60 | 80 | 100 | 120 | 140 | 160 | 180 |
| 20 | 0.771 | 0.701 | 0.739 | 0.820 | 0.850 | 0.847 | 0.819 | | | |
| 40 | 0.765 | 0.741 | 0.810 | 0.853 | 0.859 | 0.844 | | | | |
| 60 | 0.760 | 0.781 | 0.839 | 0.857 | 0.853 | | | | | |
| 80 | 0.759 | 0.806 | 0.845 | 0.851 | | | | | | |
| 100 | 0.763 | 0.815 | 0.840 | | | | | | | |
| 120 | 0.769 | 0.815 | | | | | | | | |
| 140 | 0.775 | | | | | | | | | |
| 160 | | | | | | | | | | |
| 180 | | | | | | | | | | |
| 200 | | | | | | | | | | |

Al H=250nm W=40nm

| SiO2 ta (nm) | TiO2 tb (nm) | | | | | | | | | |
|---|---|---|---|---|---|---|---|---|---|---|
| | 0 | 20 | 40 | 60 | 80 | 100 | 120 | 140 | 160 | 180 |
| 20 | 0.784 | 0.701 | 0.730 | 0.804 | | | | | | |
| 40 | 0.773 | 0.735 | 0.797 | | | | | | | |
| 60 | 0.763 | 0.774 | | | | | | | | |
| 80 | 0.759 | | | | | | | | | |
| 100 | | | | | | | | | | |
| 120 | | | | | | | | | | |
| 140 | | | | | | | | | | |
| 160 | | | | | | | | | | |
| 180 | | | | | | | | | | |
| 200 | | | | | | | | | | |

| SiO2 ta (nm) | TiO2 tb (nm) | | | | | | | | | |
|---|---|---|---|---|---|---|---|---|---|---|
| | 0 | 20 | 40 | 60 | 80 | 100 | 120 | 140 | 160 | 180 |
| 20 | 0.723 | 0.586 | 0.698 | 0.820 | 0.866 | 0.864 | 0.782 | 0.876 | 0.700 | 0.780 |
| 40 | 0.704 | 0.670 | 0.810 | 0.878 | 0.897 | 0.869 | 0.766 | 0.718 | 0.775 | |
| 60 | 0.692 | 0.758 | 0.868 | 0.906 | 0.902 | 0.850 | 0.748 | 0.745 | | |
| 80 | 0.693 | 0.817 | 0.893 | 0.906 | 0.882 | 0.807 | 0.726 | | | |
| 100 | 0.710 | 0.846 | 0.892 | 0.884 | 0.841 | 0.743 | | | | |
| 120 | 0.736 | 0.851 | 0.889 | 0.842 | 0.774 | | | | | |
| 140 | 0.761 | 0.833 | 0.826 | 0.774 | | | | | | |
| 160 | 0.777 | 0.797 | 0.754 | | | | | | | |
| 180 | 0.781 | 0.739 | | | | | | | | |
| 200 | 0.772 | | | | | | | | | |

Al H=100nm W=60nm

| SiO2 ta (nm) | TiO2 tb (nm) | | | | | | | | | |
|---|---|---|---|---|---|---|---|---|---|---|
| | 0 | 20 | 40 | 60 | 80 | 100 | 120 | 140 | 160 | 180 |
| 20 | 0.699 | 0.623 | 0.723 | 0.825 | 0.853 | 0.829 | 0.747 | 0.654 | 0.662 | 0.724 |
| 40 | 0.694 | 0.700 | 0.818 | 0.864 | 0.856 | 0.810 | 0.720 | 0.678 | 0.719 | |
| 60 | 0.695 | 0.771 | 0.851 | 0.858 | 0.827 | 0.770 | 0.694 | 0.693 | | |
| 80 | 0.706 | 0.806 | 0.844 | 0.825 | 0.783 | 0.723 | 0.672 | | | |
| 100 | 0.724 | 0.810 | 0.813 | 0.779 | 0.736 | 0.673 | | | | |
| 120 | 0.742 | 0.791 | 0.772 | 0.734 | 0.686 | | | | | |
| 140 | 0.753 | 0.760 | 0.730 | 0.687 | | | | | | |
| 160 | 0.753 | 0.725 | 0.682 | | | | | | | |
| 180 | 0.743 | 0.686 | | | | | | | | |
| 200 | 0.728 | | | | | | | | | |

Al H=150nm W=60nm

| SiO2 ta (nm) | TiO2 tb (nm) | | | | | | | | | |
|---|---|---|---|---|---|---|---|---|---|---|
| | 0 | 20 | 40 | 60 | 80 | 100 | 120 | 140 | 160 | 180 |
| 20 | 0.707 | 0.640 | 0.732 | 0.810 | 0.810 | 0.772 | 0.695 | 0.621 | 0.644 | |
| 40 | 0.706 | 0.709 | 0.802 | 0.819 | 0.793 | 0.747 | 0.665 | 0.653 | | |
| 60 | 0.708 | 0.760 | 0.808 | 0.793 | 0.759 | 0.715 | 0.636 | | | |
| 80 | 0.714 | 0.775 | 0.785 | 0.757 | 0.724 | 0.684 | | | | |
| 100 | 0.722 | 0.766 | 0.753 | 0.724 | 0.696 | | | | | |
| 120 | 0.729 | 0.745 | 0.724 | 0.699 | | | | | | |
| 140 | 0.730 | 0.723 | 0.701 | | | | | | | |
| 160 | 0.725 | 0.702 | | | | | | | | |
| 180 | 0.716 | | | | | | | | | |
| 200 | | | | | | | | | | |

Al H=200nm W=60nm

| SiO2 ta (nm) | TiO2 tb (nm) | | | | | | | | | |
|---|---|---|---|---|---|---|---|---|---|---|
| | 0 | 20 | 40 | 60 | 80 | 100 | 120 | 140 | 160 | 180 |
| 20 | 0.758 | 0.665 | 0.735 | 0.797 | 0.797 | 0.773 | 0.716 | | | |
| 40 | 0.751 | 0.719 | 0.793 | 0.805 | 0.791 | 0.765 | | | | |
| 60 | 0.743 | 0.762 | 0.801 | 0.795 | 0.779 | | | | | |
| 80 | 0.738 | 0.779 | 0.793 | 0.782 | | | | | | |
| 100 | 0.739 | 0.780 | 0.783 | | | | | | | |
| 120 | 0.744 | 0.776 | | | | | | | | |
| 140 | 0.749 | | | | | | | | | |
| 160 | | | | | | | | | | |
| 180 | | | | | | | | | | |
| 200 | | | | | | | | | | |

Al H=250nm W=60nm

| SiO2 ta (nm) | TiO2 tb (nm) | | | | | | | | | |
|---|---|---|---|---|---|---|---|---|---|---|
| | 0 | 20 | 40 | 60 | 80 | 100 | 120 | 140 | 160 | 180 |
| 20 | 0.749 | 0.640 | 0.709 | | | | | | | |
| 40 | 0.735 | 0.699 | 0.780 | | | | | | | |
| 60 | 0.724 | 0.752 | | | | | | | | |
| 80 | 0.721 | | | | | | | | | |
| 100 | | | | | | | | | | |
| 120 | | | | | | | | | | |
| 140 | | | | | | | | | | |
| 160 | | | | | | | | | | |
| 180 | | | | | | | | | | |
| 200 | | | | | | | | | | |

| SiO2 ta (nm) | Ta2O5 tb (nm) | | | | | | | | | |
|---|---|---|---|---|---|---|---|---|---|---|
| | 0 | 20 | 40 | 60 | 80 | 100 | 120 | 140 | 160 | 180 |
| 20 | 0.670 | 0.605 | 0.574 | 0.610 | 0.675 | 0.728 | 0.758 | 0.784 | 0.745 | 0.698 |
| 40 | 0.650 | 0.606 | 0.624 | 0.684 | 0.739 | 0.773 | 0.785 | 0.774 | 0.737 | |
| 60 | 0.634 | 0.636 | 0.681 | 0.739 | 0.779 | 0.798 | 0.794 | 0.787 | | |
| 80 | 0.629 | 0.664 | 0.725 | 0.773 | 0.799 | 0.803 | 0.783 | | | |
| 100 | 0.638 | 0.695 | 0.753 | 0.787 | 0.799 | 0.787 | | | | |
| 120 | 0.656 | 0.719 | 0.764 | 0.783 | 0.777 | | | | | |
| 140 | 0.677 | 0.731 | 0.758 | 0.757 | | | | | | |
| 160 | 0.695 | 0.729 | 0.732 | | | | | | | |
| 180 | 0.707 | 0.713 | | | | | | | | |
| 200 | 0.710 | | | | | | | | | |

Al H=100nm W=40nm

| SiO2 ta (nm) | Ta2O5 tb (nm) | | | | | | | | | |
|---|---|---|---|---|---|---|---|---|---|---|
| | 0 | 20 | 40 | 60 | 80 | 100 | 120 | 140 | 160 | 180 |
| 20 | 0.756 | 0.715 | 0.699 | 0.729 | 0.780 | 0.820 | 0.840 | 0.840 | 0.821 | 0.784 |
| 40 | 0.744 | 0.722 | 0.741 | 0.787 | 0.828 | 0.850 | 0.854 | 0.840 | 0.809 | |
| 60 | 0.737 | 0.744 | 0.785 | 0.827 | 0.853 | 0.850 | 0.851 | 0.826 | | |
| 80 | 0.739 | 0.772 | 0.816 | 0.847 | 0.859 | 0.853 | 0.833 | | | |
| 100 | 0.749 | 0.795 | 0.832 | 0.849 | 0.848 | 0.832 | | | | |
| 120 | 0.765 | 0.809 | 0.833 | 0.837 | 0.824 | | | | | |
| 140 | 0.781 | 0.812 | 0.821 | 0.811 | | | | | | |
| 160 | 0.792 | 0.805 | 0.798 | | | | | | | |
| 180 | 0.796 | 0.789 | | | | | | | | |
| 200 | 0.793 | | | | | | | | | |

Al H=150nm W=40nm

| SiO2 ta (nm) | Ta2O5 tb (nm) | | | | | | | | | |
|---|---|---|---|---|---|---|---|---|---|---|
| | 0 | 20 | 40 | 60 | 80 | 100 | 120 | 140 | 160 | 180 |
| 20 | 0.754 | 0.727 | 0.718 | 0.748 | 0.791 | 0.820 | 0.829 | 0.820 | 0.798 | |
| 40 | 0.749 | 0.737 | 0.756 | 0.796 | 0.825 | 0.836 | 0.830 | 0.812 | | |
| 60 | 0.746 | 0.757 | 0.791 | 0.822 | 0.836 | 0.833 | 0.819 | | | |
| 80 | 0.750 | 0.778 | 0.811 | 0.829 | 0.830 | 0.819 | | | | |
| 100 | 0.759 | 0.793 | 0.816 | 0.822 | 0.815 | | | | | |
| 120 | 0.770 | 0.799 | 0.810 | 0.807 | | | | | | |
| 140 | 0.779 | 0.796 | 0.796 | | | | | | | |
| 160 | 0.784 | 0.786 | | | | | | | | |
| 180 | 0.783 | | | | | | | | | |
| 200 | | | | | | | | | | |

Al H=200nm W=40nm

| SiO2 ta (nm) | Ta2O5 tb (nm) | | | | | | | | | |
|---|---|---|---|---|---|---|---|---|---|---|
| | 0 | 20 | 40 | 60 | 80 | 100 | 120 | 140 | 160 | 180 |
| 20 | 0.771 | 0.743 | 0.728 | 0.759 | 0.784 | 0.804 | 0.809 | | | |
| 40 | 0.765 | 0.747 | 0.759 | 0.788 | 0.809 | 0.816 | | | | |
| 60 | 0.760 | 0.761 | 0.785 | 0.808 | 0.817 | | | | | |
| 80 | 0.759 | 0.776 | 0.800 | 0.813 | | | | | | |
| 100 | 0.763 | 0.786 | 0.804 | | | | | | | |
| 120 | 0.769 | 0.790 | | | | | | | | |
| 140 | 0.775 | | | | | | | | | |
| 160 | | | | | | | | | | |
| 180 | | | | | | | | | | |
| 200 | | | | | | | | | | |

Al H=250nm W=40nm

| SiO2 ta (nm) | Ta2O5 tb (nm) | | | | | | | | | |
|---|---|---|---|---|---|---|---|---|---|---|
| | 0 | 20 | 40 | 60 | 80 | 100 | 120 | 140 | 160 | 180 |
| 20 | 0.784 | 0.746 | 0.723 | 0.740 | | | | | | |
| 40 | 0.773 | 0.745 | 0.751 | | | | | | | |
| 60 | 0.763 | 0.756 | | | | | | | | |
| 80 | 0.759 | | | | | | | | | |
| 100 | | | | | | | | | | |
| 120 | | | | | | | | | | |
| 140 | | | | | | | | | | |
| 160 | | | | | | | | | | |
| 180 | | | | | | | | | | |
| 200 | | | | | | | | | | |

| SiO2 ta (nm) | Ta2O5 tb (nm) | | | | | | | | | |
|---|---|---|---|---|---|---|---|---|---|---|
| | 0 | 20 | 40 | 60 | 80 | 100 | 120 | 140 | 160 | 180 |
| 20 | 0.723 | 0.658 | 0.632 | 0.697 | 0.775 | 0.823 | 0.838 | 0.821 | 0.770 | 0.697 |
| 40 | 0.704 | 0.665 | 0.706 | 0.782 | 0.834 | 0.854 | 0.845 | 0.806 | 0.742 | |
| 60 | 0.692 | 0.704 | 0.775 | 0.834 | 0.860 | 0.857 | 0.828 | 0.775 | | |
| 80 | 0.693 | 0.750 | 0.818 | 0.854 | 0.858 | 0.836 | 0.793 | | | |
| 100 | 0.710 | 0.785 | 0.836 | 0.848 | 0.833 | 0.797 | | | | |
| 120 | 0.736 | 0.804 | 0.829 | 0.821 | 0.790 | | | | | |
| 140 | 0.761 | 0.803 | 0.804 | 0.777 | | | | | | |
| 160 | 0.777 | 0.787 | 0.763 | | | | | | | |
| 180 | 0.781 | 0.758 | | | | | | | | |
| 200 | 0.772 | | | | | | | | | |

Al H=100nm W=60nm

| SiO2 ta (nm) | Ta2O5 tb (nm) | | | | | | | | | |
|---|---|---|---|---|---|---|---|---|---|---|
| | 0 | 20 | 40 | 60 | 80 | 100 | 120 | 140 | 160 | 180 |
| 20 | 0.699 | 0.671 | 0.669 | 0.729 | 0.789 | 0.813 | 0.803 | 0.771 | 0.722 | 0.667 |
| 40 | 0.694 | 0.689 | 0.733 | 0.792 | 0.819 | 0.813 | 0.784 | 0.743 | 0.695 | |
| 60 | 0.695 | 0.725 | 0.781 | 0.814 | 0.812 | 0.787 | 0.751 | 0.710 | | |
| 80 | 0.706 | 0.758 | 0.796 | 0.803 | 0.782 | 0.750 | 0.714 | | | |
| 100 | 0.724 | 0.774 | 0.789 | 0.774 | 0.745 | 0.712 | | | | |
| 120 | 0.742 | 0.771 | 0.764 | 0.738 | 0.707 | | | | | |
| 140 | 0.753 | 0.755 | 0.733 | 0.702 | | | | | | |
| 160 | 0.753 | 0.732 | 0.701 | | | | | | | |
| 180 | 0.743 | 0.707 | | | | | | | | |
| 200 | 0.728 | | | | | | | | | |

Al H=150nm W=60nm

| SiO2 ta (nm) | Ta2O5 tb (nm) | | | | | | | | | |
|---|---|---|---|---|---|---|---|---|---|---|
| | 0 | 20 | 40 | 60 | 80 | 100 | 120 | 140 | 160 | 180 |
| 20 | 0.707 | 0.687 | 0.682 | 0.727 | 0.765 | 0.769 | 0.750 | 0.721 | 0.685 | |
| 40 | 0.706 | 0.701 | 0.731 | 0.767 | 0.773 | 0.756 | 0.730 | 0.701 | | |
| 60 | 0.708 | 0.724 | 0.758 | 0.769 | 0.755 | 0.731 | 0.707 | | | |
| 80 | 0.714 | 0.741 | 0.759 | 0.750 | 0.729 | 0.706 | | | | |
| 100 | 0.722 | 0.744 | 0.743 | 0.726 | 0.705 | | | | | |
| 120 | 0.729 | 0.735 | 0.723 | 0.704 | | | | | | |
| 140 | 0.730 | 0.721 | 0.704 | | | | | | | |
| 160 | 0.725 | 0.706 | | | | | | | | |
| 180 | 0.718 | | | | | | | | | |
| 200 | | | | | | | | | | |

Al H=200nm W=60nm

| SiO2 ta (nm) | Ta2O5 tb (nm) | | | | | | | | | |
|---|---|---|---|---|---|---|---|---|---|---|
| | 0 | 20 | 40 | 60 | 80 | 100 | 120 | 140 | 160 | 180 |
| 20 | 0.758 | 0.721 | 0.697 | 0.727 | 0.758 | 0.766 | 0.760 | | | |
| 40 | 0.751 | 0.722 | 0.735 | 0.763 | 0.772 | 0.767 | | | | |
| 60 | 0.743 | 0.736 | 0.760 | 0.772 | 0.770 | | | | | |
| 80 | 0.738 | 0.751 | 0.765 | 0.770 | | | | | | |
| 100 | 0.739 | 0.759 | 0.767 | | | | | | | |
| 120 | 0.744 | 0.760 | | | | | | | | |
| 140 | 0.749 | | | | | | | | | |
| 160 | | | | | | | | | | |
| 180 | | | | | | | | | | |
| 200 | | | | | | | | | | |

Al H=250nm W=60nm

| SiO2 ta (nm) | Ta2O5 tb (nm) | | | | | | | | | |
|---|---|---|---|---|---|---|---|---|---|---|
| | 0 | 20 | 40 | 60 | 80 | 100 | 120 | 140 | 160 | 180 |
| 20 | 0.749 | 0.700 | 0.674 | 0.710 | | | | | | |
| 40 | 0.735 | 0.701 | 0.719 | | | | | | | |
| 60 | 0.724 | 0.722 | | | | | | | | |
| 80 | 0.721 | | | | | | | | | |
| 100 | | | | | | | | | | |
| 120 | | | | | | | | | | |
| 140 | | | | | | | | | | |
| 160 | | | | | | | | | | |
| 180 | | | | | | | | | | |
| 200 | | | | | | | | | | |

FIG. 8

Al H=50nm W=40nm
FIG. 9A SiO2 20nm
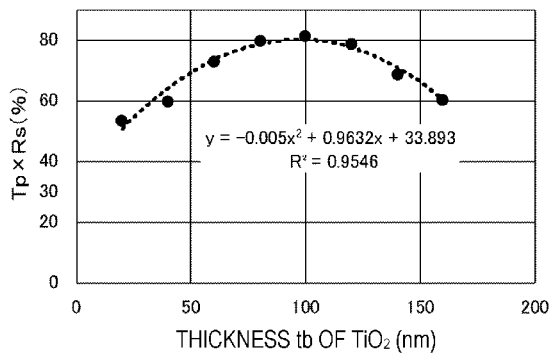
FIG. 9E SiO2 100nm
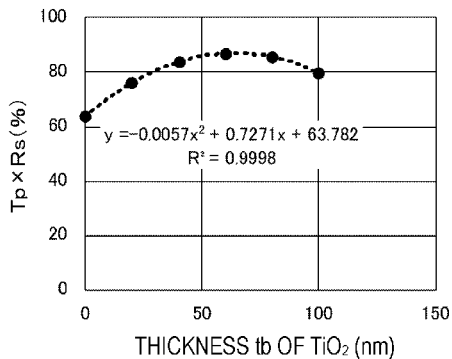
FIG. 9B SiO2 40nm
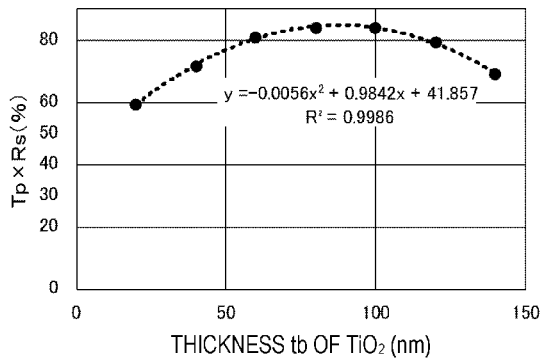
FIG. 9F SiO2 120nm
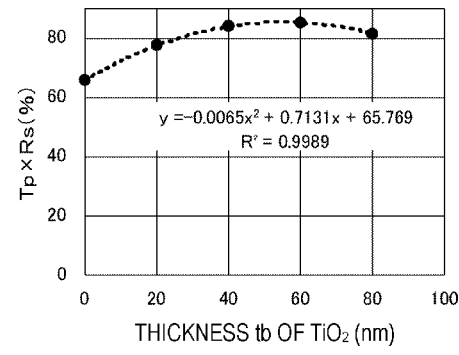
FIG. 9C SiO2 60nm
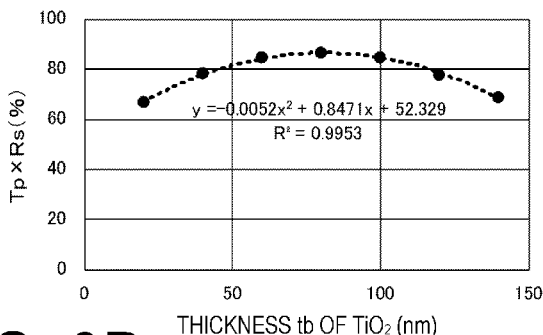
FIG. 9G SiO2 140nm
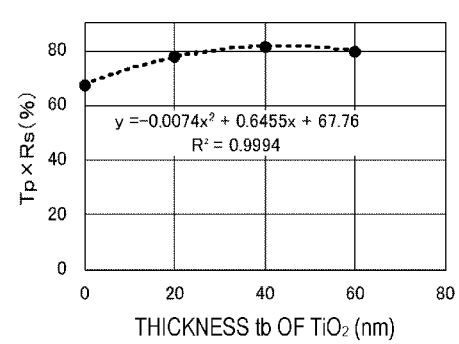
FIG. 9D SiO2 80nm
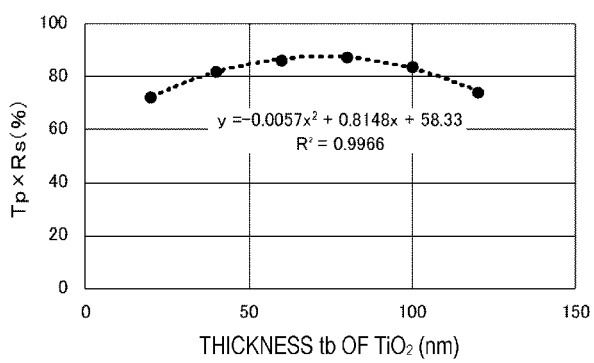

Al H=100nm W=40nm
FIG. 10A
SiO2 20nm
FIG. 10E
SiO2 100nm
FIG. 10B
SiO2 40nm
FIG. 10F
SiO2 120nm
FIG. 10C
SiO2 60nm
FIG. 10G
SiO2 140nm
FIG. 10D
SiO2 80nm
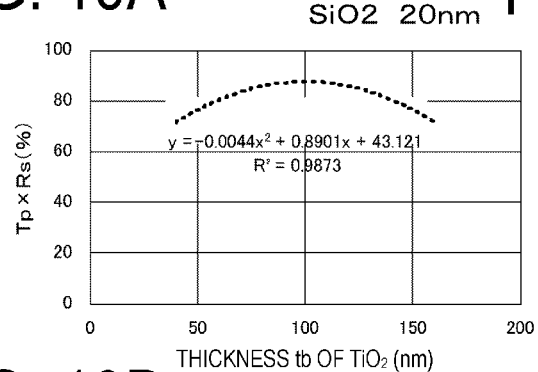
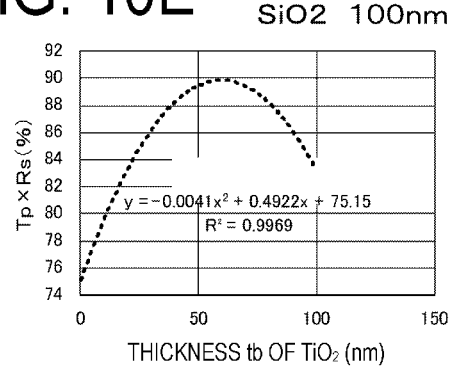
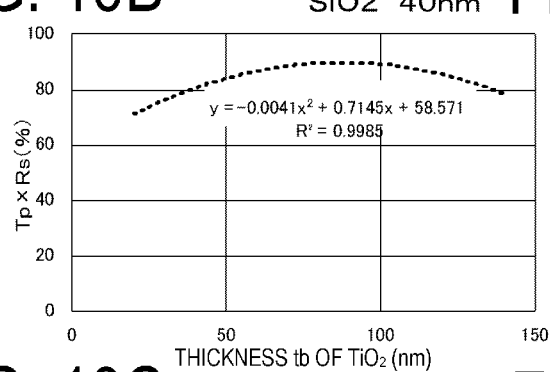
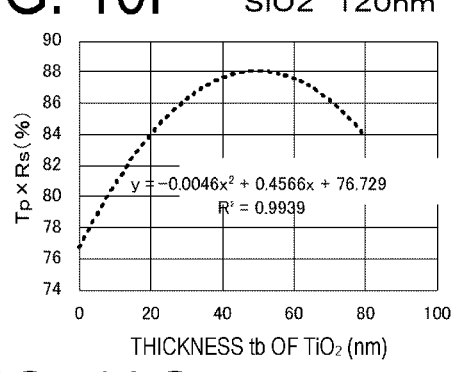
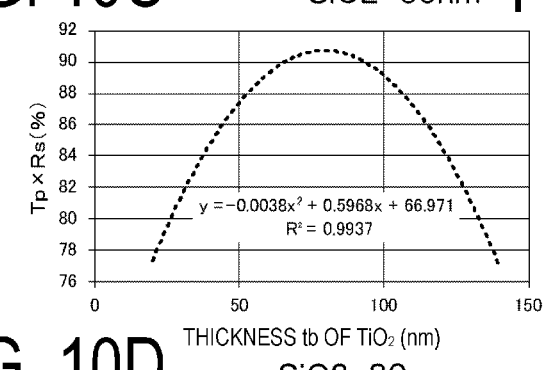
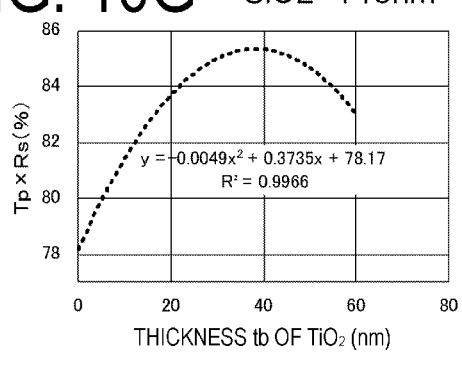
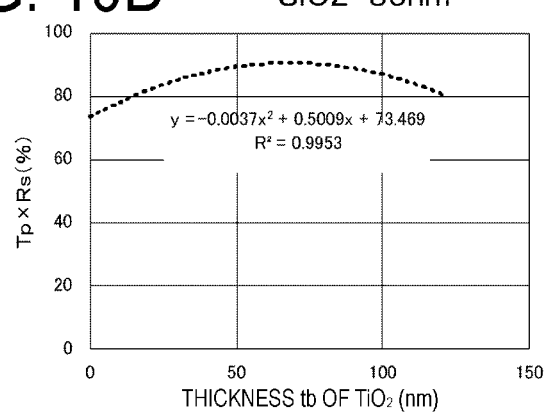

Al H=150nm W=40nm
FIG. 11A  SiO2 20nm
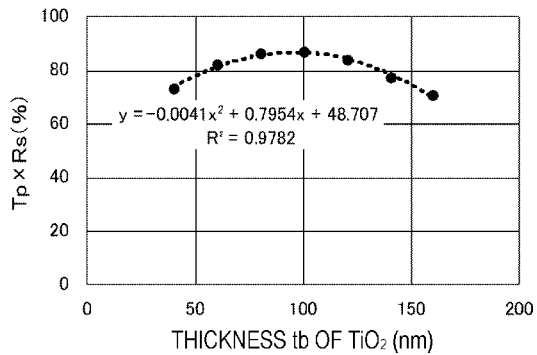
FIG. 11B  SiO2 40nm
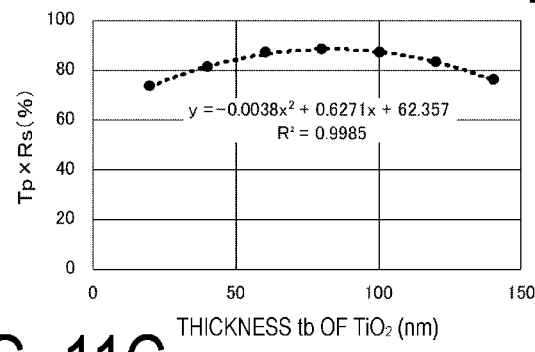
FIG. 11C  SiO2 60nm
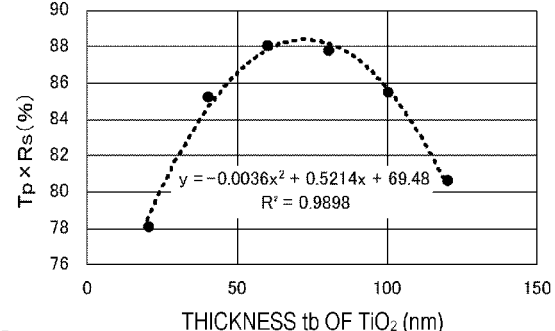
FIG. 11D  SiO2 80nm
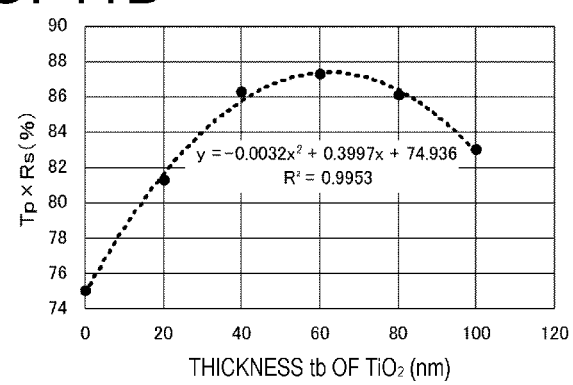
FIG. 11E  SiO2 100nm
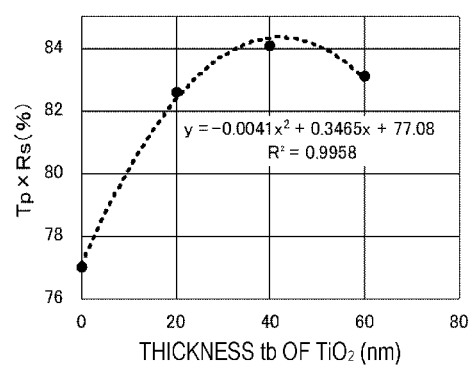
FIG. 11F  SiO2 120nm
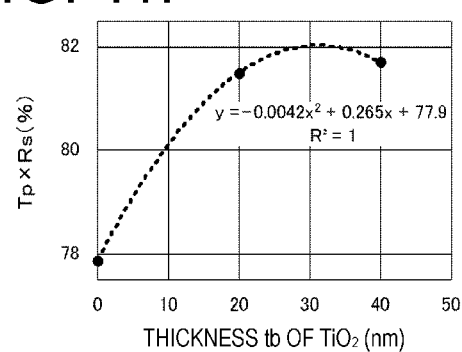

Al H=200nm W=40nm
FIG. 12A  SiO2 20nm
FIG. 12E  SiO2 100nm
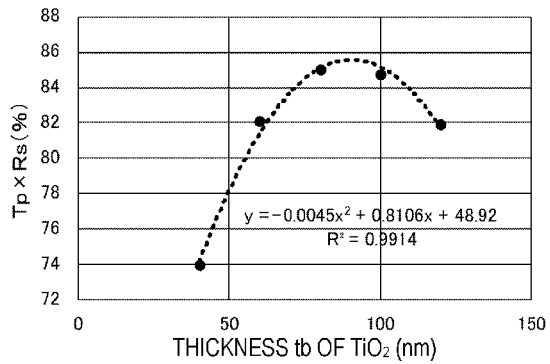
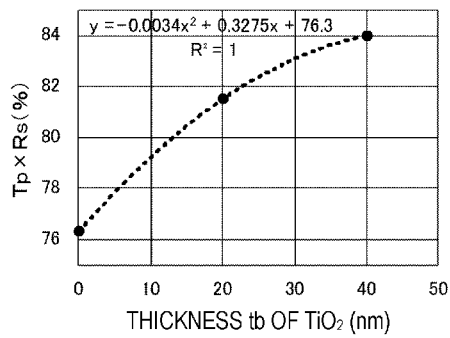
FIG. 12B  SiO2 40nm
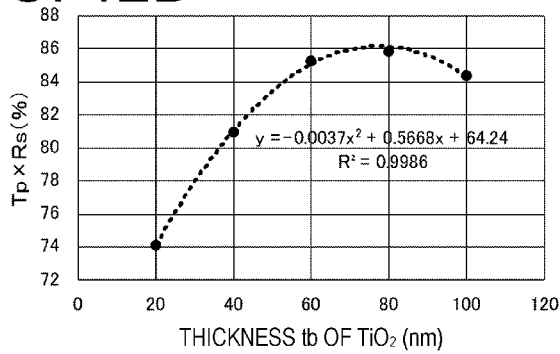
FIG. 12C  SiO2 60nm
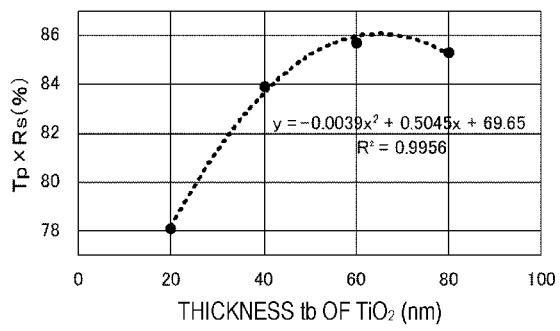
FIG. 12D  SiO2 80nm
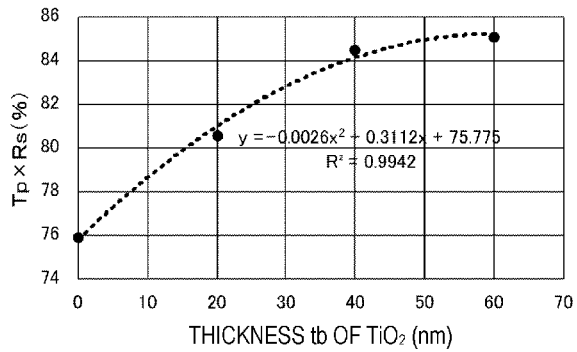

Al H=50nm W=60nm
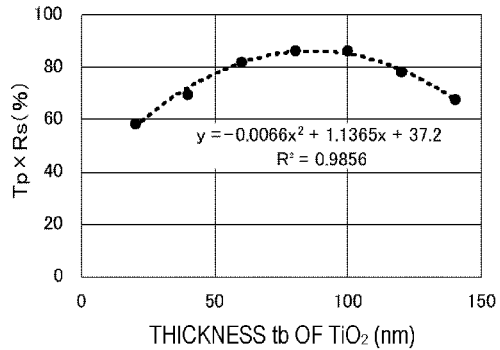
FIG. 13A  SiO2 20nm
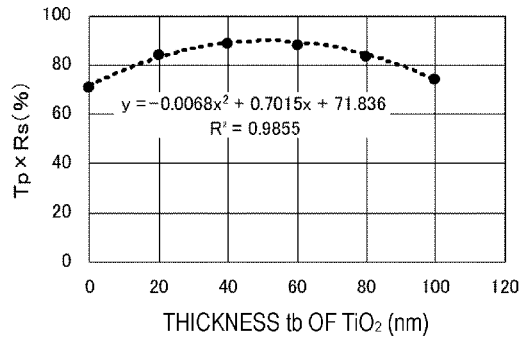
FIG. 13E  SiO2 100nm
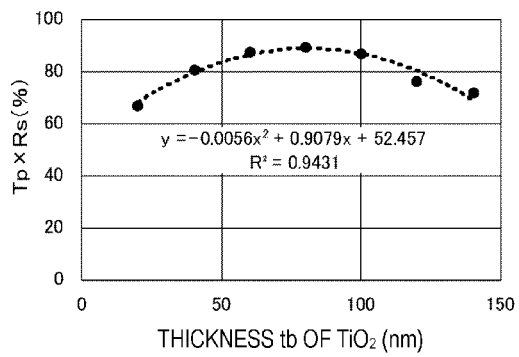
FIG. 13B  SiO2 40nm
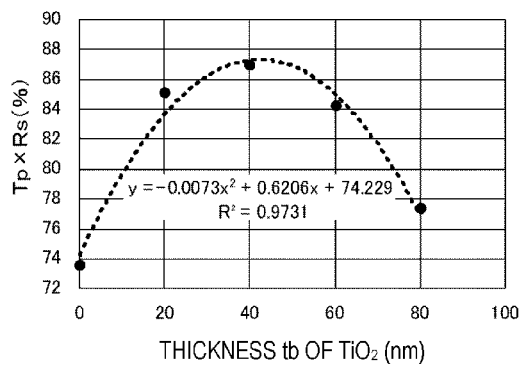
FIG. 13F  SiO2 120nm
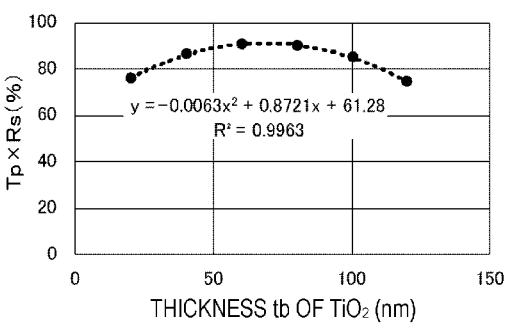
FIG. 13C  SiO2 60nm
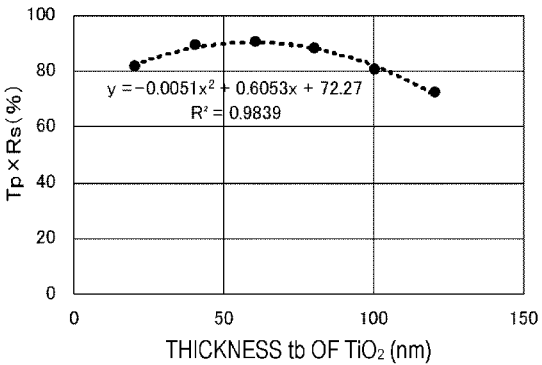
FIG. 13D  SiO2 80nm Al H=100nm W=60nm
FIG. 14A  SiO2 20nm
FIG. 14E  SiO2 100nm
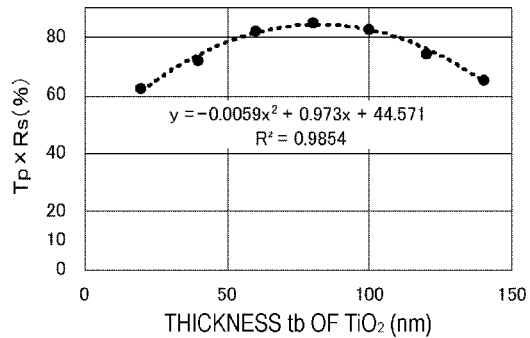
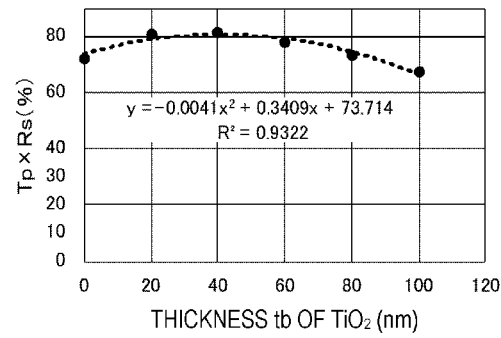
FIG. 14B  SiO2 40nm
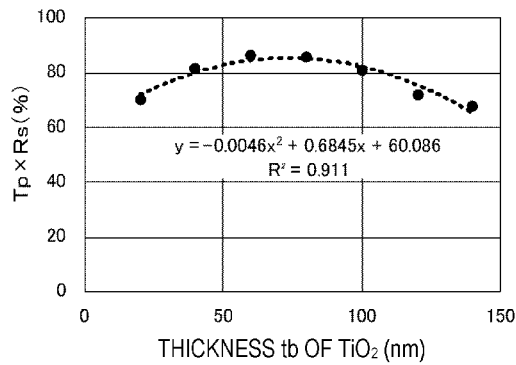
FIG. 14C  SiO2 60nm
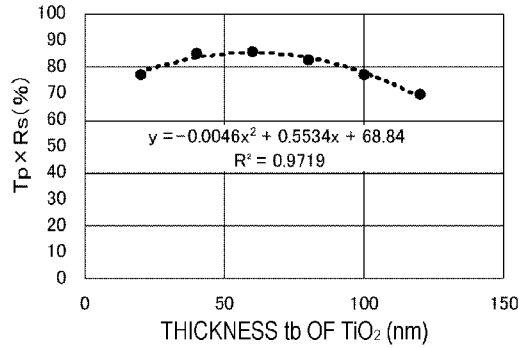
FIG. 14D  SiO2 80nm
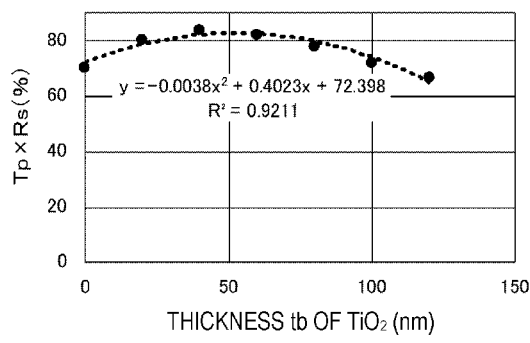

Al H=100nm W=40nm
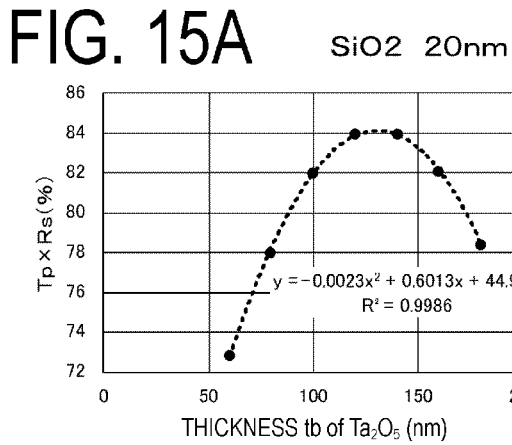
FIG. 15A  SiO2 20nm
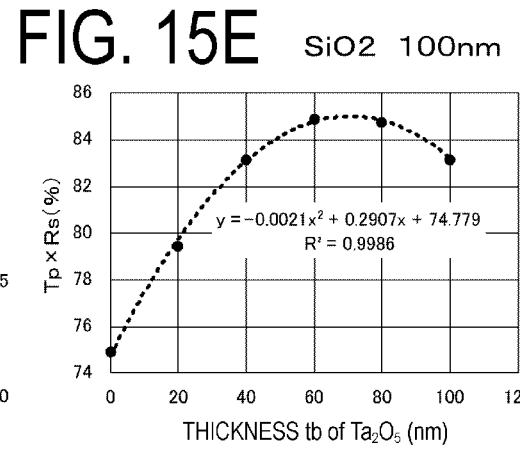
FIG. 15E  SiO2 100nm
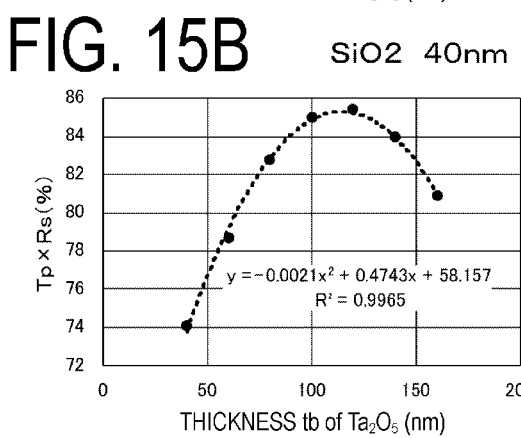
FIG. 15B  SiO2 40nm
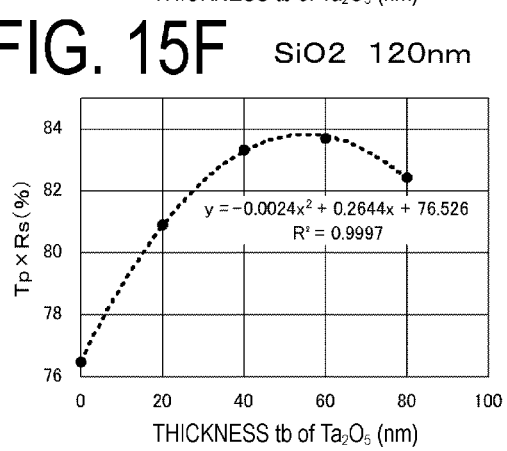
FIG. 15F  SiO2 120nm
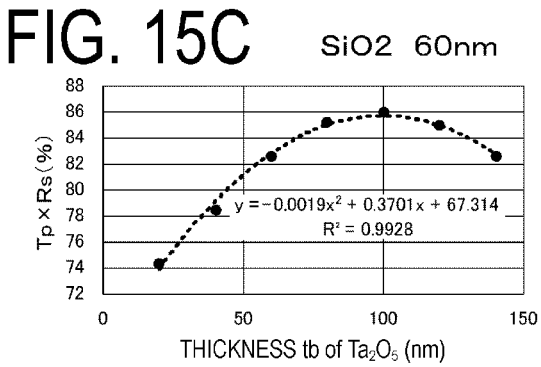
FIG. 15C  SiO2 60nm
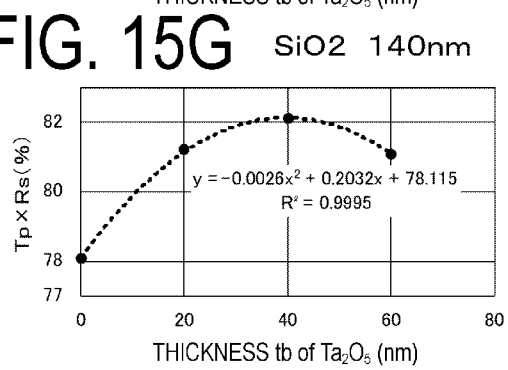
FIG. 15G  SiO2 140nm
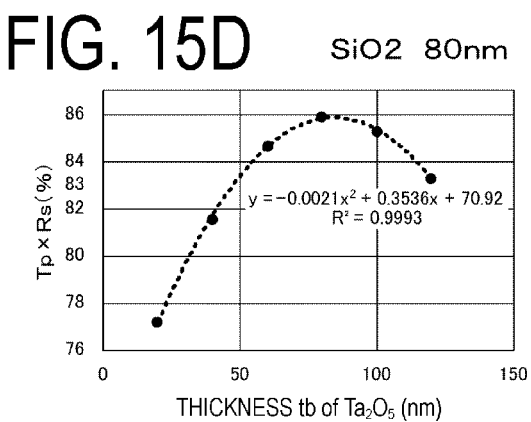
FIG. 15D  SiO2 80nm Al H=150nm W=40nm
FIG. 16A SiO2 20nm
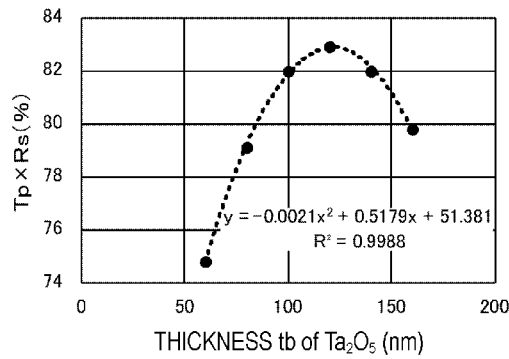
FIG. 16E SiO2 100nm
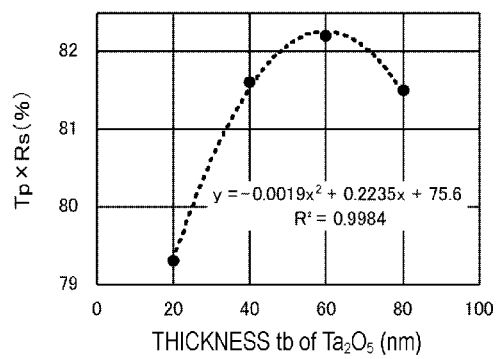
FIG. 16B SiO2 40nm
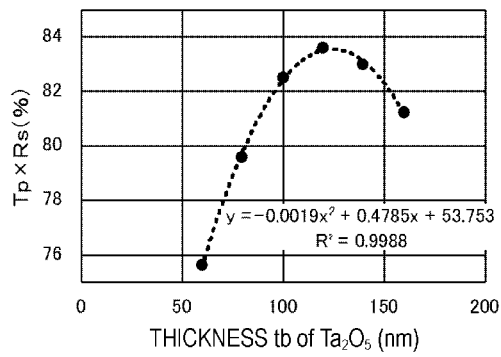
FIG. 16C SiO2 60nm
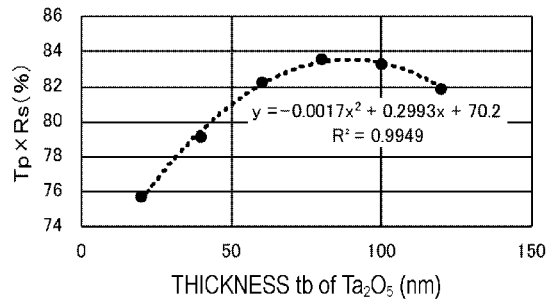
FIG. 16D SiO2 80nm
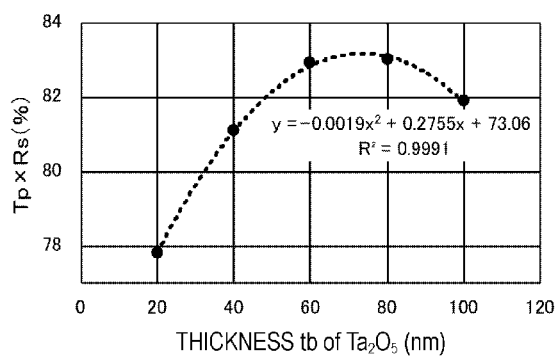

Al H=50nm W=60nm
FIG. 17A  SiO2 20nm
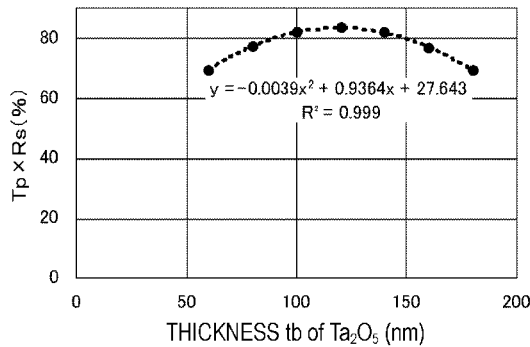
FIG. 17E  SiO2 100nm
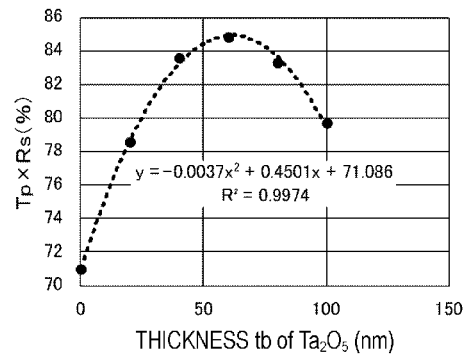
FIG. 17B  SiO2 40nm
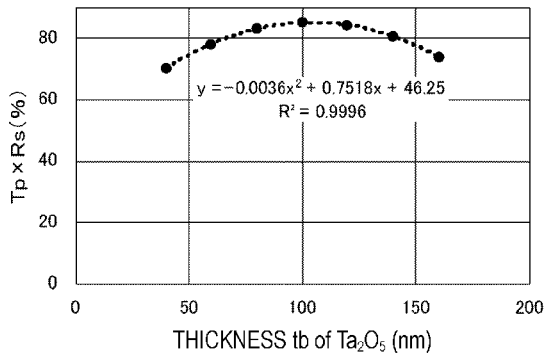
FIG. 17F  SiO2 120nm
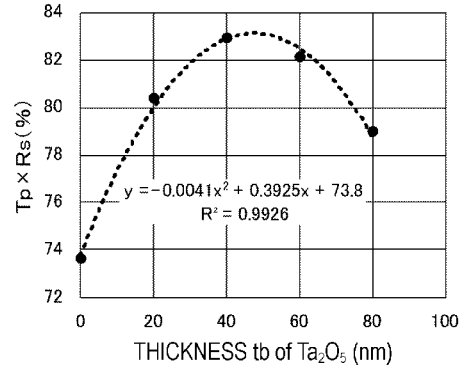
FIG. 17C  SiO2 60nm
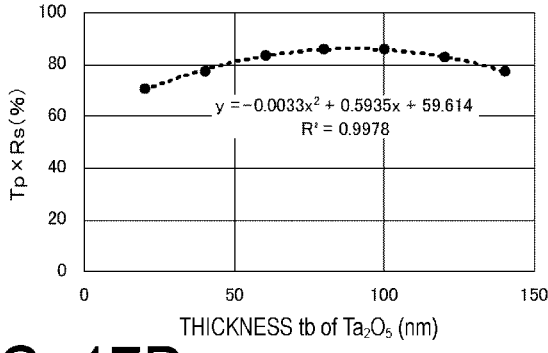
FIG. 17G  SiO2 140nm
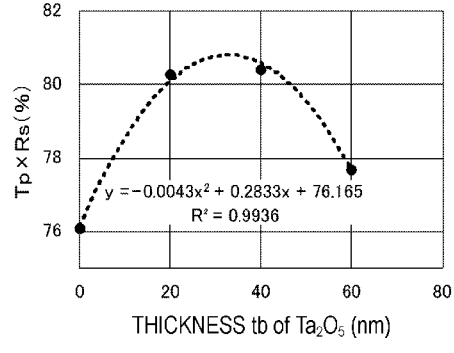
FIG. 17D  SiO2 80nm
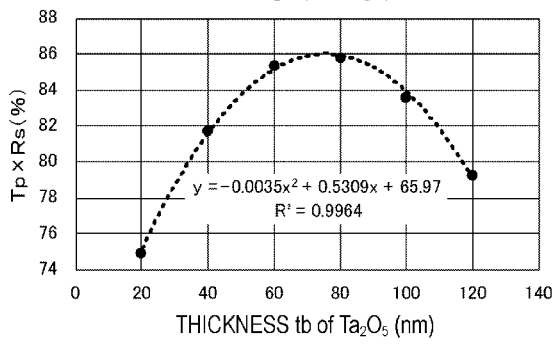

Al W=40nm    HIGH REFRACTIVE INDEX FILM 5 = TiO$_2$

|  |  | a | b | c | LOWER LIMIT VALUE OF TiO$_2$ tb1 (nm) | UPPER LIMIT VALUE OF TiO$_2$ tb2 (nm) | OPTIMUM THICKNESS OF TiO$_2$ tb0 (nm) -(b/2a) |
|---|---|---|---|---|---|---|---|
| Al =H50nm | ta(nm) |  |  |  |  |  |  |
| SiO2 | 20 | -0.005 | 0.9632 | 33.893 | 88.82718 | 103.81282 | 96.32000 |
| SiO2 | 40 | -0.0056 | 0.9842 | 41.857 | 57.69611 | 118.05389 | 87.87500 |
| SiO2 | 60 | -0.0052 | 0.8471 | 52.329 | 45.21562 | 117.68823 | 81.45192 |
| SiO2 | 80 | -0.0057 | 0.8148 | 58.33 | 35.32492 | 107.62245 | 71.47368 |
| SiO2 | 100 | -0.0057 | 0.7271 | 63.782 | 28.81336 | 98.74804 | 63.78070 |
| SiO2 | 120 | -0.0065 | 0.7131 | 65.769 | 26.22589 | 83.48180 | 54.85385 |
| SiO2 | 140 | -0.0074 | 0.6455 | 67.76 | 27.86042 | 59.36930 | 43.61486 |
| Al H=100nm | ta(nm) |  |  |  |  |  |  |
| SiO2 | 20 | -0.0044 | 0.8901 | 43.121 | 58.14457 | 144.15089 | 101.14773 |
| SiO2 | 40 | -0.0041 | 0.7145 | 58.571 | 38.49492 | 135.77337 | 87.13415 |
| SiO2 | 60 | -0.0038 | 0.5968 | 66.971 | 26.20330 | 130.84933 | 78.52632 |
| SiO2 | 80 | -0.0037 | 0.5009 | 73.469 | 14.61668 | 120.76170 | 67.68919 |
| SiO2 | 100 | -0.0041 | 0.4922 | 75.15 | 10.83089 | 109.21789 | 60.02439 |
| SiO2 | 120 | -0.0046 | 0.4566 | 76.726 | 7.78021 | 91.48065 | 49.63043 |
| SiO2 | 140 | -0.0049 | 0.3735 | 78.17 | 5.26299 | 70.96150 | 38.11224 |
| SiO2 | 160 | -0.006 | 0.265 | 79.1 |  | 40.45923 | 22.08333 |
| Al H=150nm | ta(nm) |  |  |  |  |  |  |
| SiO2 | 20 | -0.0041 | 0.7954 | 48.707 | 54.85073 | 139.14927 | 97.00000 |
| SiO2 | 40 | -0.0038 | 0.6271 | 62.357 | 35.97794 | 129.04838 | 82.51316 |
| SiO2 | 60 | -0.0036 | 0.5214 | 69.48 | 24.23004 | 120.60330 | 72.41667 |
| SiO2 | 80 | -0.0032 | 0.3997 | 74.936 | 14.30863 | 110.59762 | 62.45313 |
| SiO2 | 100 | -0.0041 | 0.3465 | 77.08 | 9.49358 | 75.01862 | 42.25610 |
| SiO2 | 120 | -0.0042 | 0.265 | 77.9 | 9.29336 | 53.80188 | 31.54762 |
| Al H=200nm | ta(nm) |  |  |  |  |  |  |
| SiO2 | 20 | -0.0045 | 0.8106 | 48.92 | 55.34869 | 124.78464 | 90.06667 |
| SiO2 | 40 | -0.0037 | 0.5668 | 64.24 | 36.50379 | 116.68540 | 76.59459 |
| SiO2 | 60 | -0.0039 | 0.5045 | 69.65 | 25.56952 | 103.78946 | 64.67949 |
| SiO2 | 80 | -0.0026 | 0.3112 | 75.775 | 15.61311 | 104.07920 | 59.84615 |
| SiO2 | 100 | -0.0034 | 0.3275 | 76.3 | 13.07159 | 83.25194 | 48.16176 |

FIG. 19

Al W=60nm     HIGH REFRACTIVE INDEX FILM 5 = TiO₂

| | | a | b | c | LOWER LIMIT VALUE OF TiO₂ tb1 (nm) | UPPER LIMIT VALUE OF TiO₂ tb2 (nm) | OPTIMUM THICKNESS OF TiO₂ tb0 (nm) -(b/2a) |
|---|---|---|---|---|---|---|---|
| Al =H50nm | ta(nm) | | | | | | |
| SiO2 | 20 | −0.0066 | 1.1365 | 37.2 | 55.63374 | 116.56323 | 86.09848 |
| SiO2 | 40 | −0.0056 | 0.9079 | 52.457 | 40.40864 | 121.71636 | 81.06250 |
| SiO2 | 60 | −0.0063 | 0.8721 | 61.28 | 26.56234 | 111.86623 | 69.21429 |
| SiO2 | 80 | −0.0051 | 0.6053 | 72.27 | 14.55562 | 104.13065 | 59.34314 |
| SiO2 | 100 | −0.0068 | 0.7015 | 71.836 | 13.37095 | 89.79082 | 51.58088 |
| SiO2 | 120 | −0.0073 | 0.6206 | 74.229 | 10.62764 | 74.38606 | 42.50685 |
| SiO2 | 140 | −0.0078 | 0.481 | 76.27 | 9.09651 | 52.57015 | 30.83333 |
| Al H=100nm | ta(nm) | | | | | | |
| SiO2 | 20 | −0.0059 | 0.973 | 44.571 | 54.27350 | 110.64175 | 82.45763 |
| SiO2 | 40 | −0.0046 | 0.6845 | 60.086 | 39.66670 | 109.13765 | 74.40217 |
| SiO2 | 60 | −0.0046 | 0.5534 | 68.84 | 25.62397 | 94.68038 | 60.15217 |
| SiO2 | 80 | −0.0038 | 0.4023 | 72.398 | 24.62336 | 81.24506 | 52.93421 |
| SiO2 | 100 | −0.0041 | 0.3409 | 73.714 | 27.60328 | 55.54306 | 41.57317 |
| SiO2 | 120 | −0.0054 | 0.3047 | 74.445 | | | 28.21296 |
| SiO2 | 140 | −0.0031 | 0.0735 | 75.42 | | | |
| Al H=150nm | ta(nm) | | | | | | |
| SiO2 | 20 | −0.005 | 0.7703 | 50.971 | 65.72421 | 88.33579 | 77.03000 |
| SiO2 | 40 | −0.005 | 0.6457 | 60.91 | 45.82740 | 83.31260 | 64.57000 |
| SiO2 | 60 | −0.0033 | 0.3313 | 71.43 | | | 50.19697 |
| SiO2 | 80 | −0.003 | 0.2549 | 72.318 | | | 42.48333 |
| SiO2 | 100 | −0.0029 | 0.1816 | 72.814 | | | 31.31034 |
| SiO2 | 120 | −0.0026 | 0.0982 | 73.065 | | | 18.88462 |
| SiO2 | 140 | −0.0019 | 0.0025 | 73 | | | 0.65789 |
| Al H=200nm | ta(nm) | | | | | | |
| SiO2 | 20 | −0.0044 | 0.6646 | 54.71 | | | 75.52273 |
| SiO2 | 40 | −0.004 | 0.5293 | 63.46 | 50.59085 | 81.73415 | 66.16250 |
| SiO2 | 60 | −0.0034 | 0.3662 | 70.425 | 44.68982 | 63.01606 | 53.85294 |
| SiO2 | 80 | −0.0032 | 0.268 | 73.81 | | | 41.87500 |
| SiO2 | 100 | −0.0048 | 0.3 | 73.9 | | | 31.25000 |

FIG. 20

Al W=40nm    HIGH REFRACTIVE INDEX FILM 5 = Ta$_2$O$_5$

| | | a | b | c | LOWER LIMIT VALUE OF Ta$_2$O$_5$ tb1 (nm) | UPPER LIMIT VALUE OF Ta$_2$O$_5$ tb2 (nm) | OPTIMUM THICKNESS OF Ta$_2$O$_5$ tb0 (nm) -(b/2a) |
|---|---|---|---|---|---|---|---|
| Al H=50nm | ta(nm) | | | | | | |
| SiO2 | 20 | -0.0029 | 0.77 | 24.81 | | | 132.75862 |
| SiO2 | 40 | -0.0026 | 0.7145 | 28.255 | | | 137.40385 |
| SiO2 | 60 | -0.0022 | 0.4776 | 53.571 | | | 108.54545 |
| SiO2 | 80 | -0.0026 | 0.4853 | 57.55 | 84.64941 | 102.00443 | 93.32692 |
| SiO2 | 100 | -0.0029 | 0.4569 | 61.6 | | | 78.77586 |
| SiO2 | 120 | -0.0028 | 0.3757 | 65.783 | | | 67.08929 |
| SiO2 | 140 | -0.0034 | 0.3397 | 67.695 | | | 49.95588 |
| Al H=100nm | ta(nm) | | | | | | |
| SiO2 | 20 | -0.0023 | 0.6013 | 44.955 | 87.70484 | 173.72995 | 130.71739 |
| SiO2 | 40 | -0.0021 | 0.4743 | 58.157 | 64.43699 | 161.42015 | 112.92857 |
| SiO2 | 60 | -0.0019 | 0.3701 | 67.314 | 44.39575 | 150.39372 | 97.39474 |
| SiO2 | 80 | -0.0021 | 0.3536 | 70.92 | 31.61456 | 136.76639 | 84.19048 |
| SiO2 | 100 | -0.0021 | 0.2907 | 74.779 | 21.20984 | 117.21873 | 69.21429 |
| SiO2 | 120 | -0.0024 | 0.2644 | 76.526 | 15.25026 | 94.91641 | 55.08333 |
| SiO2 | 140 | -0.0026 | 0.2032 | 78.115 | 10.75721 | 67.39663 | 39.07692 |
| Al H=150nm | ta(nm) | | | | | | |
| SiO2 | 20 | -0.0021 | 0.5179 | 51.381 | 83.59626 | 163.02279 | 123.30952 |
| SiO2 | 40 | -0.0019 | 0.4785 | 53.753 | 80.73365 | 171.10845 | 125.92105 |
| SiO2 | 60 | -0.0017 | 0.2993 | 70.2 | 43.48200 | 132.57682 | 88.02941 |
| SiO2 | 80 | -0.0019 | 0.2775 | 73.6 | 28.70452 | 117.34811 | 73.02632 |
| SiO2 | 100 | -0.0019 | 0.2235 | 75.6 | 25.00000 | 92.63158 | 58.81579 |
| SiO2 | 120 | -0.002 | 0.181 | 77.02 | 21.63724 | 68.86276 | 45.25000 |
| Al200nm | ta(nm) | | | | | | |
| SiO2 | 20 | -0.0018 | 0.4247 | 56.35 | 90.06960 | 145.87484 | 117.97222 |
| SiO2 | 40 | -0.0014 | 0.2885 | 66.53 | 71.49321 | 134.57822 | 103.03571 |
| SiO2 | 60 | -0.0009 | 0.1892 | 72.625 | 51.68919 | 158.53303 | 105.11111 |
| SiO2 | 80 | -0.0002 | 0.118 | 73.55 | 60.95941 | 529.04059 | 295.00000 |

FIG. 21

Al W=60nm      HIGH REFRACTIVE INDEX FILM 5 = $Ta_2O_5$

| | | a | b | c | LOWER LIMIT VALUE OF $Ta_2O_5$ tb1 (nm) | UPPER LIMIT VALUE OF $Ta_2O_5$ tb2 (nm) | OPTIMUM THICKNESS OF $Ta_2O_5$ tb0 (nm) -(b/2a) |
|---|---|---|---|---|---|---|---|
| Al H=50nm | ta(nm) | | | | | | |
| SiO2 | 20 | −0.0039 | 0.9364 | 27.643 | 88.62775 | 151.47482 | 120.05128 |
| SiO2 | 40 | −0.0036 | 0.7518 | 46.25 | 65.32907 | 143.50426 | 104.41667 |
| SiO2 | 60 | −0.0033 | 0.5935 | 59.614 | 46.23450 | 133.61399 | 89.92424 |
| SiO2 | 80 | −0.0035 | 0.5309 | 65.97 | 34.08681 | 117.59891 | 75.84286 |
| SiO2 | 100 | −0.0037 | 0.4501 | 71.086 | 24.90206 | 96.74659 | 60.82432 |
| SiO2 | 120 | −0.0041 | 0.3925 | 73.8 | 19.95627 | 75.77544 | 47.86585 |
| SiO2 | 140 | −0.0043 | 0.2833 | 76.165 | 19.03842 | 46.84530 | 32.94186 |
| Al H=100nm | ta(nm) | | | | | | |
| SiO2 | 20 | −0.0029 | 0.634 | 46.155 | 92.63516 | 125.98553 | 109.31034 |
| SiO2 | 40 | −0.0027 | 0.5041 | 58.229 | 67.83255 | 118.87116 | 93.35185 |
| SiO2 | 60 | −0.0026 | 0.4975 | 57.336 | 74.78254 | 116.56361 | 95.67308 |
| SiO2 | 80 | −0.0025 | 0.4043 | 63.814 | 72.86378 | 88.85622 | 80.86000 |
| SiO2 | 100 | −0.0026 | 0.2407 | 72.939 | | | |
| SiO2 | 120 | −0.0025 | 0.1471 | 74.514 | | | |
| SiO2 | 140 | −0.0021 | 0.0362 | 75.375 | | | |

FIG. 22

HIGH REFRACTIVE INDEX FILM 5 = TiO$_2$   Al WIDTH W = 40nm
FIG. 23A  Al THICKNESS H = 50nm
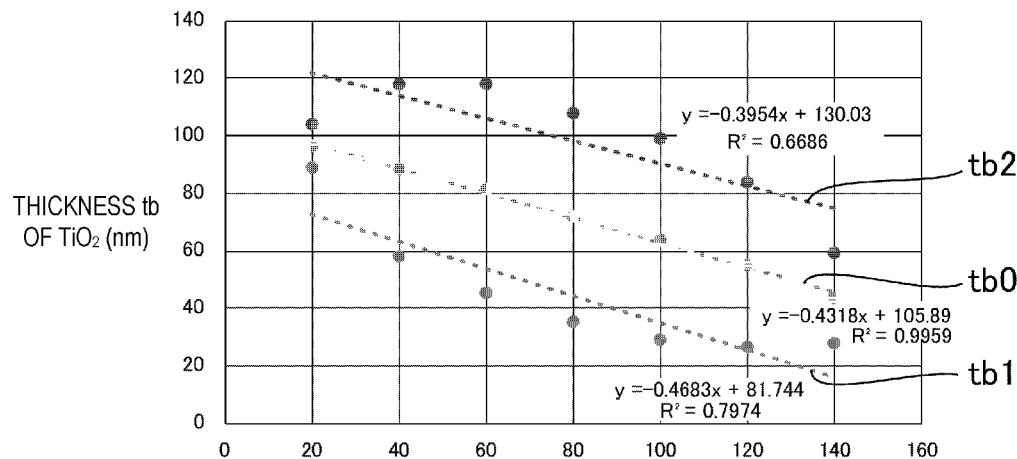
FIG. 23B  Al THICKNESS H = 100nm
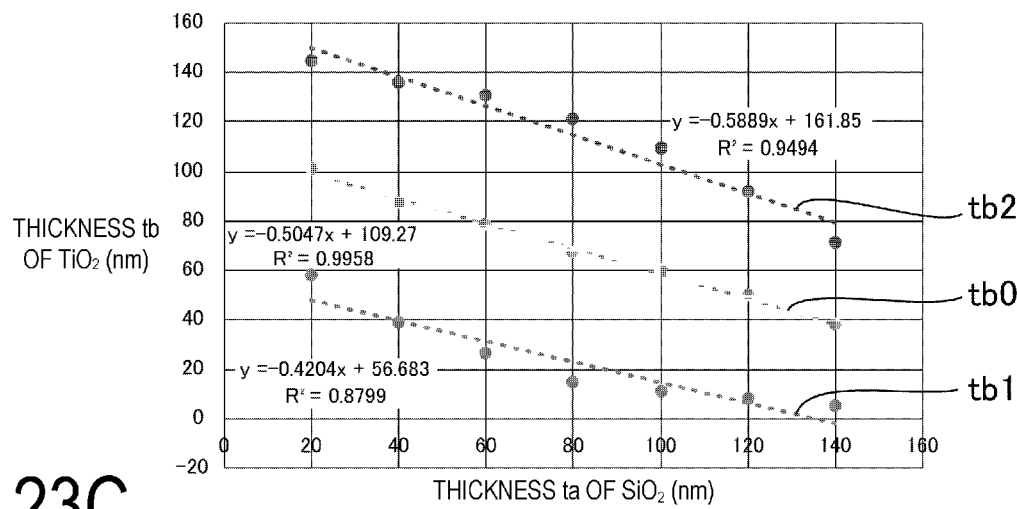
FIG. 23C  Al THICKNESS H = 150nm
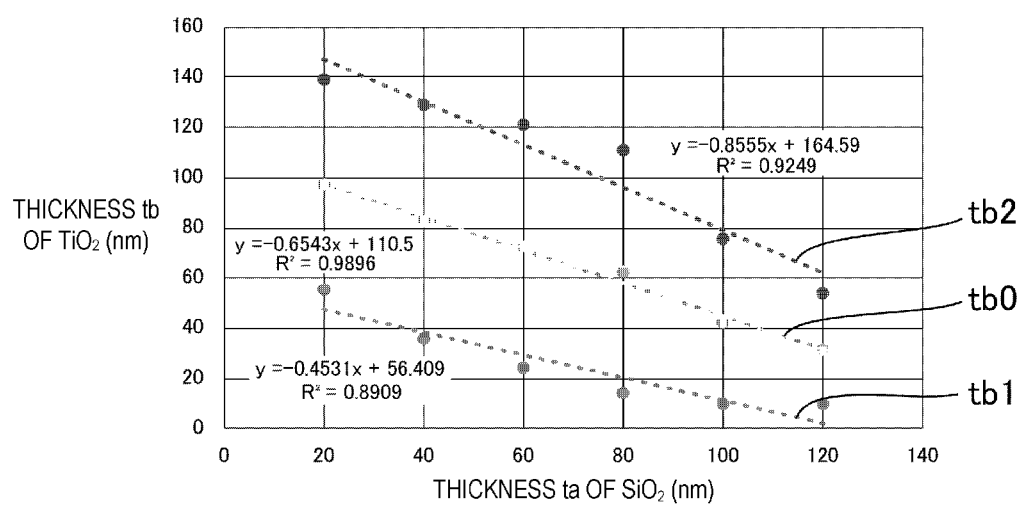

HIGH REFRACTIVE INDEX FILM 5 = TiO₂   Al WIDTH W = 60nm
FIG. 24A  Al THICKNESS H = 50nm
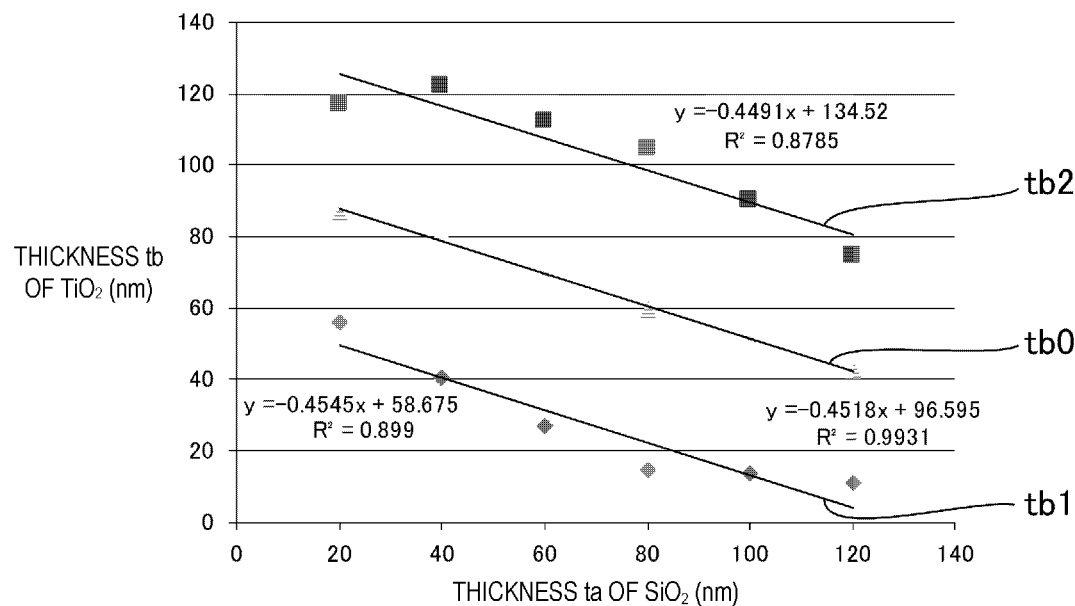
FIG. 24B  Al THICKNESS H = 100nm
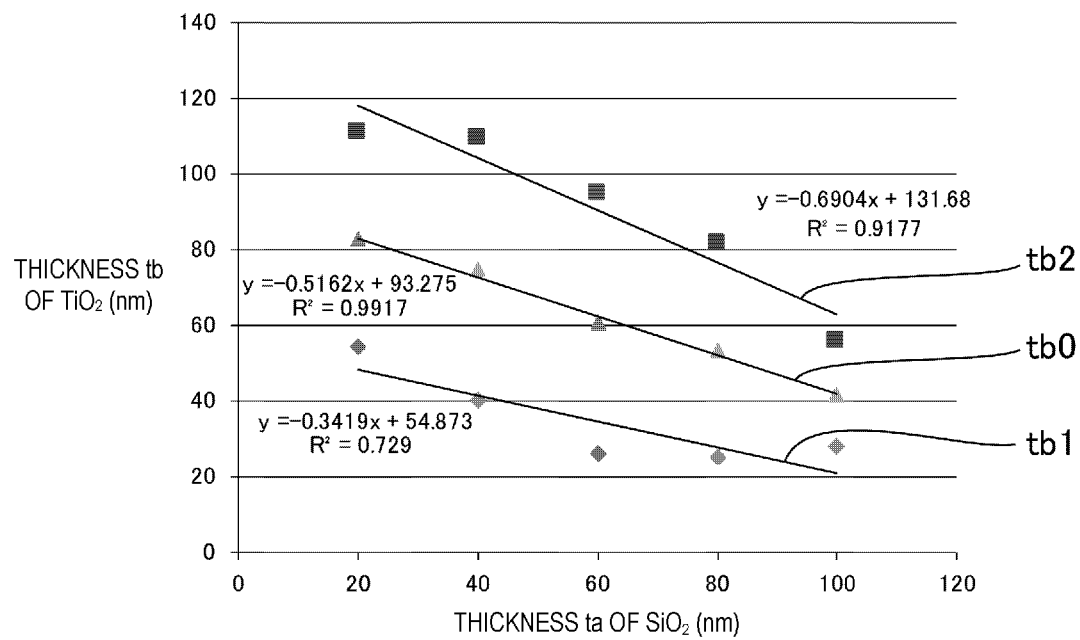

HIGH REFRACTIVE INDEX FILM 5 = Ta$_2$O$_5$    Al WIDTH W = 40nm
FIG. 25A  Al THICKNESS H = 50nm
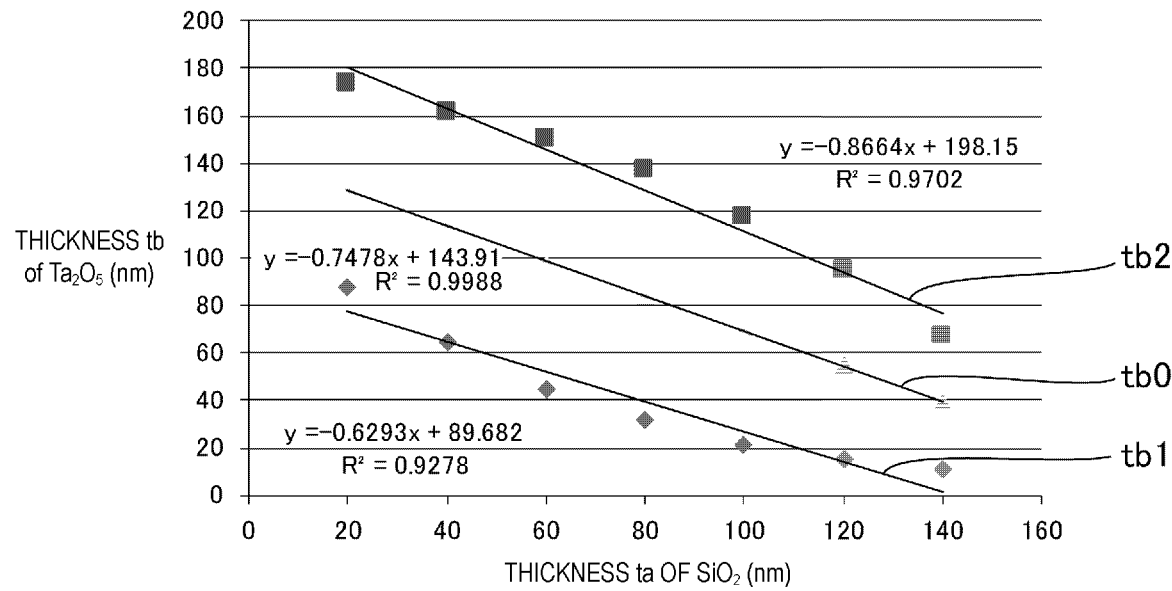
FIG. 25B  Al THICKNESS H = 150nm
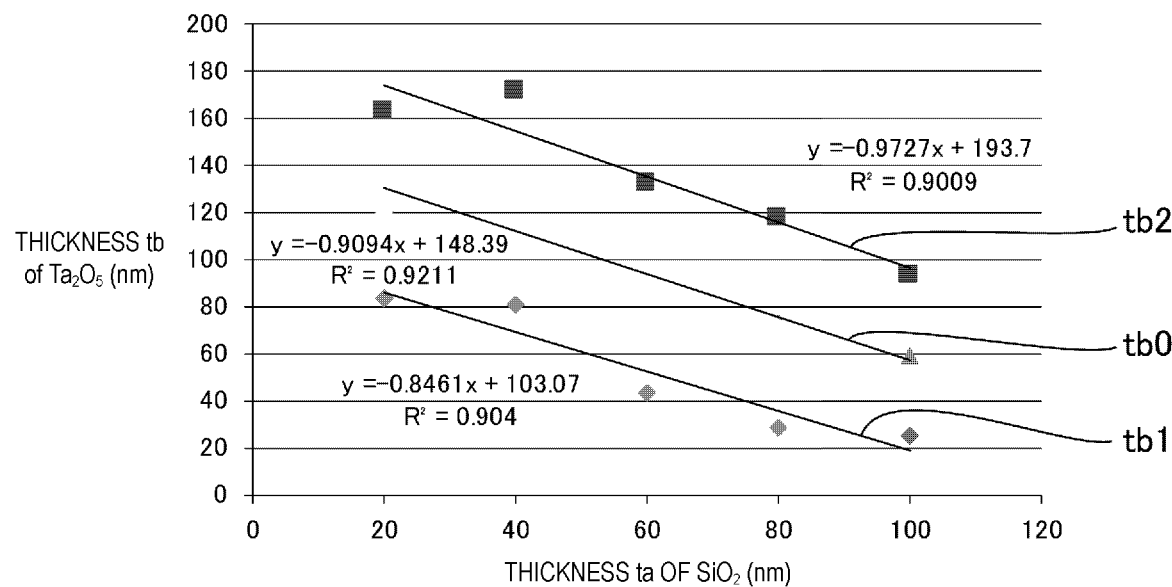

HIGH REFRACTIVE INDEX FILM 5 = Ta₂O₅   WIDTH W = 60nm
FIG. 26A  Al THICKNESS H = 50nm
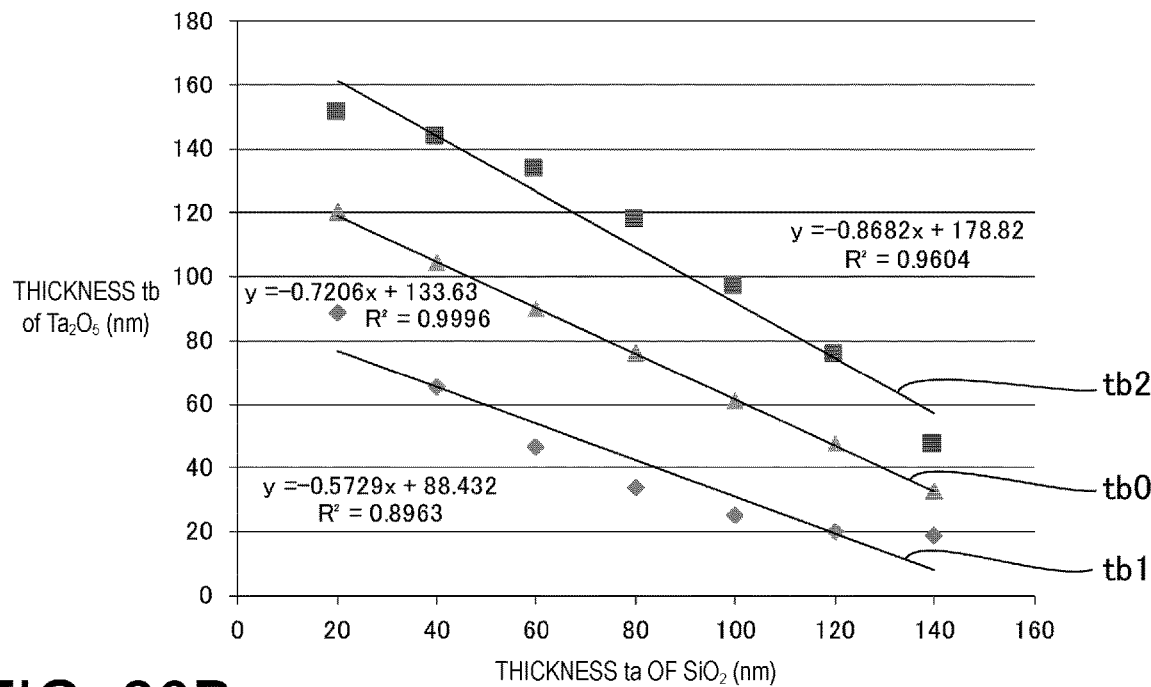
FIG. 26B  Al THICKNESS H = 100nm
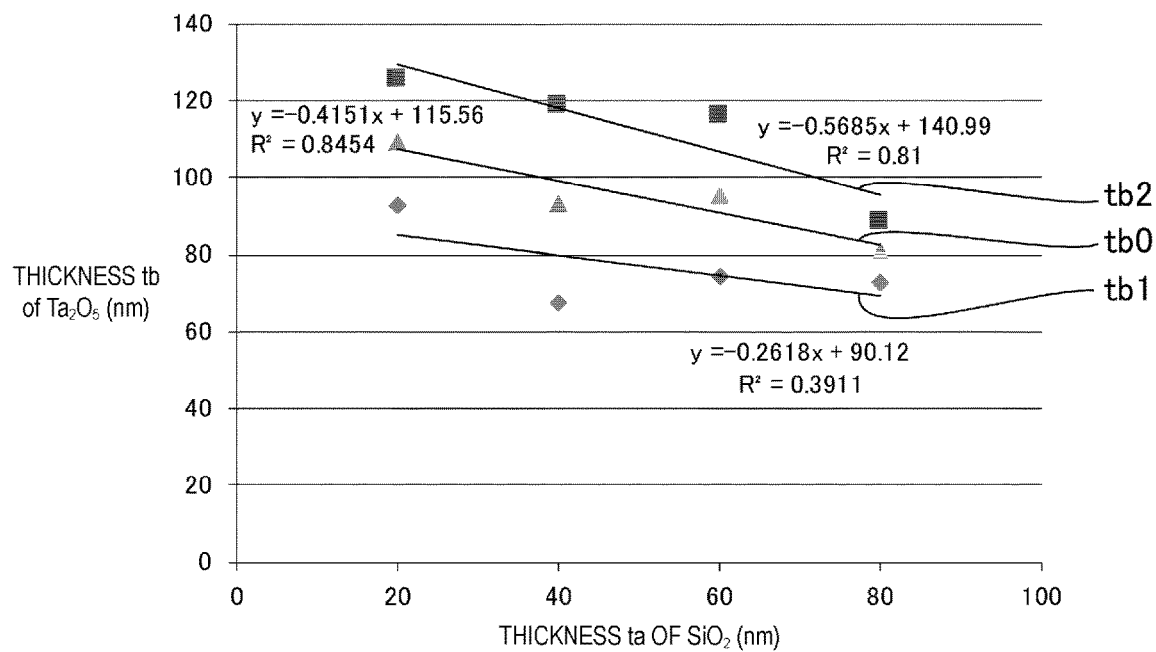

FIG. 27A
HIGH REFRACTIVE INDEX FILM 5 = TiO$_2$   Al WIDTH W = 40nm
a
| THICKNESS OF Al (nm) | LOWER LIMIT VALUE tb1 | UPPER LIMIT VALUE tb2 | OPTIMUM VALUE tb0 |
|---|---|---|---|
| 50 | −0.4683 | −0.3954 | −0.4318 |
| 100 | −0.4204 | −0.5889 | −0.5047 |
| 150 | −0.4531 | −0.8555 | −0.6543 |
b
| THICKNESS OF Al (nm) | LOWER LIMIT VALUE tb1 | UPPER LIMIT VALUE tb2 | OPTIMUM VALUE tb0 |
|---|---|---|---|
| 50 | 81.744 | 130.03 | 105.89 |
| 100 | 56.683 | 161.85 | 109.27 |
| 150 | 56.409 | 164.59 | 110.5 |
FIG. 27B
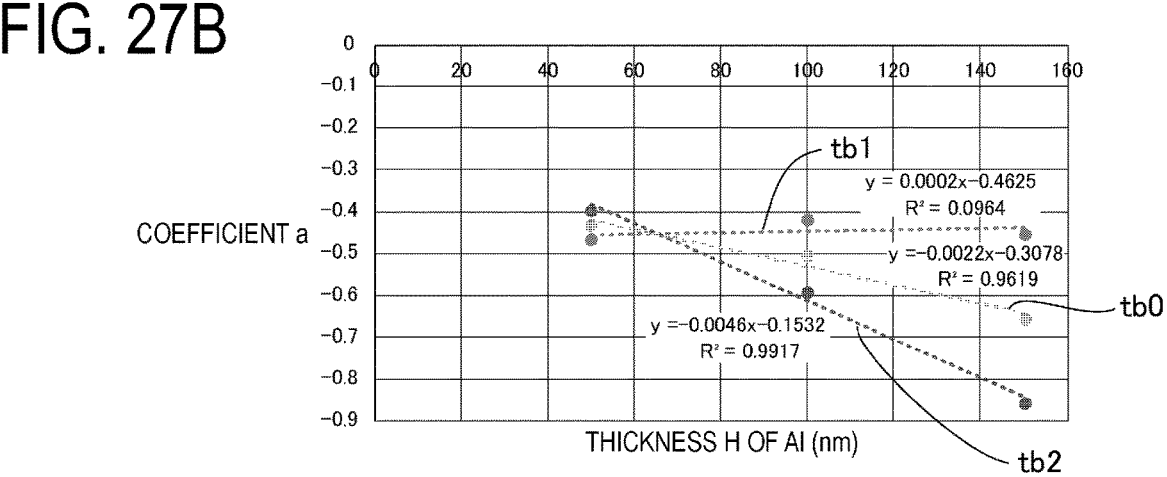
FIG. 27C
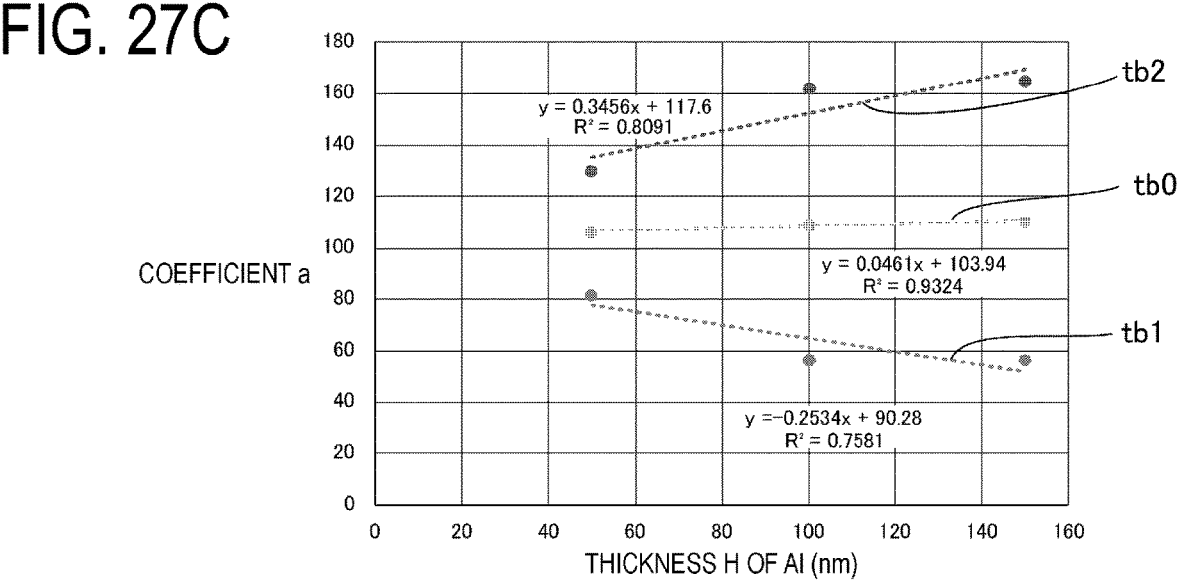

| | | | | FILM THICKNESS OF SiO$_2$ | | | | | | |
|---|---|---|---|---|---|---|---|---|---|---|---|
| | | | a | b | 20 | 40 | 60 | 80 | 100 | 120 | 140 |
| (i) | | THICKNESS H OF Al (nm) WIDTH W of Al = 40nm | | | | | | | | | |
| BASIC CONDITIONS | 50 | UPPER LIMIT OF TiO$_2$ | −0.3832 | 134.88 | 127.216 | 119.552 | 111.888 | 104.224 | 96.56 | 88.896 | 81.232 |
| | 50 | LOWER LIMIT OF TiO$_2$ | −0.4725 | 77.61 | 68.16 | 58.71 | 49.26 | 39.81 | 30.36 | 20.91 | 11.46 |
| | 100 | UPPER LIMIT OF TiO$_2$ | −0.6132 | 152.16 | 139.896 | 127.632 | 115.368 | 103.104 | 90.84 | 78.576 | 66.312 |
| | 100 | LOWER LIMIT OF TiO$_2$ | −0.4825 | 64.94 | 55.29 | 45.64 | 35.99 | 26.34 | 16.69 | 7.04 | −2.61 |
| | 150 | UPPER LIMIT OF TiO$_2$ | −0.8432 | 169.44 | 152.576 | 135.712 | 118.848 | 101.984 | 85.12 | 68.256 | 51.392 |
| | 150 | LOWER LIMIT OF TiO$_2$ | −0.4925 | 52.27 | 42.42 | 32.57 | 22.72 | 12.87 | 3.02 | −6.83 | −16.68 |
| (ii) | | THICKNESS H OF Al (nm) WIDTH W of Al = 60nm | | | | | | | | | |
| W CORRECTION OF METAL PORTION 3 −20nm | 50 | UPPER LIMIT OF TiO$_2$ | | | 107.216 | 99.552 | 91.888 | 84.224 | 76.56 | 68.896 | 61.232 |
| | 50 | LOWER LIMIT OF TiO$_2$ | | | 48.16 | 38.71 | 29.26 | 19.81 | 10.36 | 0.91 | −8.54 |
| | 100 | UPPER LIMIT OF TiO$_2$ | | | 119.896 | 107.632 | 95.368 | 83.104 | 70.84 | 58.576 | 46.312 |
| | 100 | LOWER LIMIT OF TiO$_2$ | | | 35.29 | 25.64 | 15.99 | 6.34 | −3.31 | −12.96 | −22.61 |
| | 150 | UPPER LIMIT OF TiO$_2$ | | | 132.576 | 115.712 | 98.848 | 81.984 | 65.12 | 48.256 | 31.392 |
| | 150 | LOWER LIMIT OF TiO$_2$ | | | 22.42 | 12.57 | 2.72 | −7.13 | −16.98 | −26.83 | −36.68 |
| (iii) | | THICKNESS H OF Al (nm) WIDTH W of Al = 40nm | | | | | | | | | |
| CORRECTION OF REFRACTIVE INDEX OF HIGH REFRACTIVE INDEX FILM 5 × 1.24 | 50 | UPPER LIMIT (UPPER LIMIT OF Ta$_2$O$_5$) | | | 157.7478 | 148.2445 | 138.7411 | 129.2378 | 119.7344 | 110.231 | 100.7277 |
| | 50 | LOWER LIMIT (LOWER LIMIT OF Ta$_2$O$_5$) | | | 84.5184 | 72.8004 | 61.0824 | 49.3644 | 37.6464 | 25.9284 | 14.2104 |
| | 100 | UPPER LIMIT (UPPER LIMIT OF Ta$_2$O$_5$) | | | 173.471 | 158.2637 | 143.0563 | 127.849 | 112.6416 | 97.43424 | 82.22688 |
| | 100 | LOWER LIMIT (LOWER LIMIT OF Ta$_2$O$_5$) | | | 68.5596 | 56.5936 | 44.6276 | 32.6616 | 20.6956 | 8.7296 | −3.2364 |
| | 150 | UPPER LIMIT (UPPER LIMIT OF Ta$_2$O$_5$) | | | 189.1942 | 168.2829 | 147.3715 | 126.4602 | 105.5488 | 84.63744 | 63.72608 |
| | 150 | LOWER LIMIT (LOWER LIMIT OF Ta$_2$O$_5$) | | | 52.6008 | 40.3868 | 28.1728 | 15.9588 | 3.7448 | −8.4692 | −20.6832 |
| (iv) | | THICKNESS H OF Al (nm) WIDTH W of Al = 60nm | | | | | | | | | |
| CORRECTION OF REFRACTIVE INDEX OF HIGH REFRACTIVE INDEX FILM 5 AND W CORRECTION OF METAL PORTION 3 X 1.24 −20nm | 50 | UPPER LIMIT (UPPER LIMIT OF Ta$_2$O$_5$) | | | 137.7478 | 128.2445 | 118.7411 | 109.2378 | 99.7344 | 90.23104 | 80.72768 |
| | 50 | LOWER LIMIT (LOWER LIMIT OF Ta$_2$O$_5$) | | | 64.5184 | 52.8004 | 41.0824 | 29.3644 | 17.6464 | 5.9284 | −5.7896 |
| | 100 | UPPER LIMIT (UPPER LIMIT OF Ta$_2$O$_5$) | | | 153.471 | 138.2637 | 123.0563 | 107.849 | 92.6416 | 77.43424 | 62.22688 |
| | 100 | LOWER LIMIT (LOWER LIMIT OF Ta$_2$O$_5$) | | | 48.5596 | 36.5936 | 24.6276 | 12.6616 | 0.6956 | −11.2704 | −23.2364 |
| | 150 | UPPER LIMIT (UPPER LIMIT OF Ta$_2$O$_5$) | | | 169.1942 | 148.2829 | 127.3715 | 106.4602 | 85.5488 | 64.63744 | 43.72608 |
| | 150 | LOWER LIMIT (LOWER LIMIT OF Ta$_2$O$_5$) | | | 32.6008 | 20.3868 | 8.1728 | −4.0412 | −16.2552 | −28.4692 | −40.6832 |

FIG. 28

DISPLAY DEVICE AND REFLECTIVE POLARIZING ELEMENT

The present application is based on, and claims priority from JP Application Serial Number 2018-236087, filed Dec. 18, 2018, the disclosure of which is hereby incorporated by reference herein in its entirety.

BACKGROUND

1. Technical Field

The present disclosure relates to a display device including a light guide and a reflective polarizing element.

2. Related Art

In a display device or the like, an illumination device provided with a light source unit and a light guide on which light emitted from the light source unit is incident may be used. In this type of illumination device, a configuration has been proposed in which a reflective polarizing element is disposed so as to face an emission surface of the light guide (see JP-A-2011-138627).

In the configuration described in JP-A-2011-138627, of light emitted from the light guide, the reflective polarizing element transmits only light of a first polarization component and reflects light of a second polarization component having a different polarization direction from that of the light of the first polarization component. When the light of the second polarization component is reflected by the reflective polarizing element, the polarization direction rotates. Thus, part of the light of the second polarization component reflected by the reflective polarizing element becomes the light of the first polarization component, is reflected inside the light guide, is guided toward the reflective polarizing element, and is transmitted through the reflective polarizing element. Therefore, in JP-A-2011-138627, it is described that by repeating the above-described operation, the polarization directions of the light emitted from the light guide can be aligned, and at the same time, light utilization efficiency can be improved.

With the reflective polarizing element used in JP-A-2011-138627, both transmittance of the light of the first polarization component and reflectance of the second polarization component are required to be high. However, the reflective polarizing element offering both the high transmittance and the high reflectance has not been realized yet. Thus, even if the configuration described in JP-A-2011-138627 is employed, there is a problem in that light absorption in the reflective polarizing element is so large that the light utilization efficiency cannot be improved.

SUMMARY

In order to solve the above-described problem, an aspect of a display device according to the present disclosure includes a light source unit, a light guide on which light emitted from the light source unit is incident, a liquid crystal panel configured to modulate light emitted from the light guide, and a reflective polarizing element provided between the light guide and the liquid crystal panel. The reflective polarizing element includes a reflective metal portion extending in one direction and a reflection enhancing portion provided on a light incident side of the metal portion.

Further, an aspect of a reflective polarizing element according to the present disclosure includes a reflective metal portion extending in one direction, and a reflection enhancing portion provided on a light incident side of the metal portion. The reflection enhancing portion includes a low refractive index film, and a high refractive index film provided on an opposite side of the low refractive index film from the metal portion and having a higher refractive index than a refractive index of the low refractive index film. A thickness tb of the high refractive index film satisfies both conditional expressions (a1) and (b1) described below:

$$[(A0 \times ta + B0) \times (2.66/n) - (W-40)] - 30 \text{ nm} \leq tb, \quad \text{conditional expression (a1)}$$

and $$[(A0 \times ta + B0) \times (2.66/n) - (W-40)] + 30 \text{ nm} \geq tb \quad \text{conditional expression (b1)}$$

provided that, in the conditional expressions (a1) and (b1) described above, $$A0 = -0.0022H - 0.3078$$

$$B0 = 0.0461H + 103.94$$

$$tb > 0$$

when a thickness of the metal portion is H nm, a width of the metal portion is W nm, a refractive index of the high refractive index film is n, a thickness of the low refractive index film is ta, and the thickness of the high refractive index film is tb.

Further, another aspect of a reflective polarizing element according to the present disclosure includes a reflective metal portion extending in one direction, and a reflection enhancing portion provided on a light incident side of the metal portion. The reflection enhancing portion includes a low refractive index film and a high refractive index film provided on an opposite side of the low refractive index film from the metal portion and having a higher refractive index than a refractive index of the low refractive index film. A thickness tb of the high refractive index film satisfies both conditional expressions (a2) and (b2) described below:

$$[(A1 \times ta + B1) \times (2.66/n) - (W-40)] \leq tb \quad \text{conditional expression (a2)}$$

provided that, in the conditional expression (a2) described above, $$A1 = -0.0002H - 0.4625$$

$$B1 = -0.2534H + 90.28$$

$$tb > 0, \text{ and}$$

$$[(A2 \times ta + B2) \times (2.66/n) - (W-40)] \geq tb \quad \text{conditional expression (b2)}$$

provided that, in the conditional expression (b2) described above, $$A2 = -0.0046H - 0.1532$$

$$B2 = 0.3456H + 117.6$$

when a thickness of the metal portion is H nm, a width of the metal portion is W nm, a refractive index of the high refractive index film is n, a thickness of the low refractive index film is ta, and the thickness of the high refractive index film is tb.

BRIEF DESCRIPTION OF THE DRAWINGS

FIG. 5 is an explanatory diagram showing values of a product Tp×Rs when the width of the metal portion illustrated in FIG. 3 is 40 nm and a high refractive index film is $TiO_2$.

FIG. 6 is an explanatory diagram showing values of Tp×Rs when the width of the metal portion illustrated in FIG. 3 is 60 nm and the high refractive index film is $TiO_2$.

FIG. 7 is an explanatory diagram showing values of the product Tp×Rs when the width of the metal portion illustrated in FIG. 3 is 40 nm and the high refractive index film is $Ta_2O_5$.

FIG. 8 is an explanatory diagram showing values of the product Tp×Rs when the width of the metal portion illustrated in FIG. 3 is 60 nm and the high refractive index film is $Ta_2O_5$.

FIGS. 9A to 9G are graphs each showing a relationship between the thickness of $TiO_2$ and the product Tp×Rs when the thickness of the metal portion is 50 nm and the width thereof is 40 nm, among the results shown in FIG. 5.

FIGS. 10A to 10G are graphs each showing a relationship between the thickness of $TiO_2$ and the product Tp×Rs when the thickness of the metal portion is 100 nm and the width thereof is 40 nm, among the results shown in FIG. 5.

FIGS. 11A to 11F are graphs each showing a relationship between the thickness of $TiO_2$ and the product Tp×Rs when the thickness of the metal portion is 150 nm and the width thereof is 40 nm, among the results shown in FIG. 5.

FIGS. 12A to 12E are graphs each showing a relationship between the thickness of $TiO_2$ and the product Tp×Rs when the thickness of the metal portion is 200 nm and the width thereof is 40 nm, among the results shown in FIG. 5.

FIGS. 13A to 13F are graphs each showing a relationship between the thickness of $TiO_2$ and the product Tp×Rs when the thickness of the metal portion is 50 nm and the width thereof is 60 nm, among the results shown in FIG. 6.

FIGS. 14A to 14E are graphs each showing a relationship between the thickness of $TiO_2$ and the product Tp×Rs when the thickness of the metal portion is 100 nm and the width thereof is 60 nm, among the results shown in FIG. 6.

FIGS. 15A to 15G are graphs each showing a relationship between the thickness of $Ta_2O_5$ and the product Tp×Rs when the thickness of the metal portion is 100 nm and the width thereof is 40 nm, among the results shown in FIG. 7.

FIGS. 16A to 16E are graphs each showing a relationship between the thickness of $Ta_2O_5$ and the product Tp×Rs when the thickness of the metal portion is 150 nm and the width thereof is 40 nm, among the results shown in FIG. 7.

FIGS. 17A to 17G are graphs each showing a relationship between the thickness of $Ta_2O_5$ and the product Tp×Rs when the thickness of the metal portion is 50 nm and the width thereof is 60 nm, among the results shown in FIG. 8.

FIG. 19 is an explanatory diagram showing optimum thicknesses and the like of the high refractive index film when the width of the metal portion illustrated in FIG. 3 is 40 nm and the high refractive index film is $TiO_2$.

FIG. 20 is an explanatory diagram showing the optimum thicknesses and the like of the high refractive index film when the width of the metal portion illustrated in FIG. 3 is 60 nm and the high refractive index film is $TiO_2$.

FIG. 21 is an explanatory diagram showing the optimum thicknesses and the like of the high refractive index film when the width of the metal portion illustrated in FIG. 3 is 40 nm and the high refractive index film is $Ta_2O_5$.

FIG. 22 is an explanatory diagram showing the optimum thicknesses and the like of the high refractive index film when the width of the metal portion illustrated in FIG. 3 is 60 nm and the high refractive index film is $Ta_2O_5$.

FIGS. 23A to 23C are graphs each showing changes in the optimum thickness of $TiO_2$ and the like when the width of the metal portion illustrated in FIG. 3 is 40 nm.

FIGS. 24A and 24B are graphs each showing changes in the optimum thickness of $TiO_2$ and the like when the width of the metal portion illustrated in FIG. 3 is 60 nm.

FIGS. 25A and 25B are graphs each showing changes in the optimum thickness of $Ta_2O_5$ and the like when the width of the metal portion illustrated in FIG. 3 is 40 nm.

FIGS. 26A and 26B are graphs each showing changes in the optimum thickness of $Ta_2O_5$ and the like when the width of the metal portion illustrated in FIG. 3 is 60 nm.

FIG. 27A to 27C are explanatory diagrams showing a method for determining coefficients in an approximate expression for the optimum thickness, a lower limit value, and an upper limit value of the high refractive index film illustrated in FIG. 3.

FIG. 28 is an explanatory diagram for verifying optimization conditions 2 based on the approximate expression.

DESCRIPTION OF EXEMPLARY EMBODIMENTS

Figure 1:
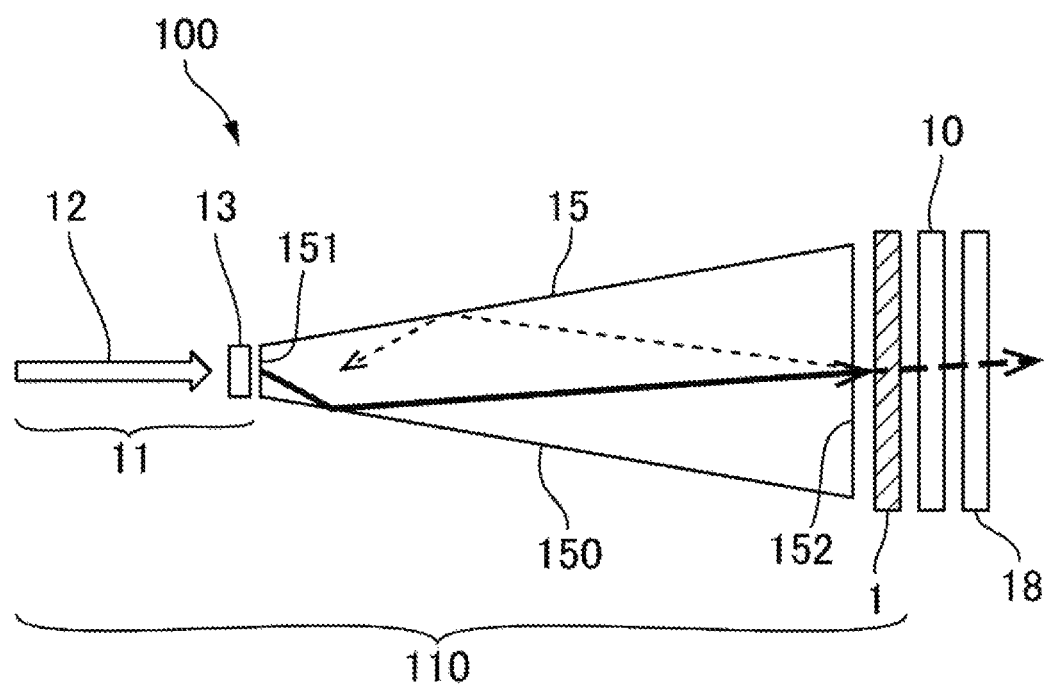
FIG. 1 is an explanatory diagram schematically illustrating an aspect of a first configuration example of a display device according to the present disclosure.

Exemplary embodiments of the present disclosure will be described below with reference to the drawings. Note that, in each of the drawings to be referred to in the following description, to illustrate each layer, each member, and the like in a recognizable size in the drawings, each layer, each member, and the like are illustrated at a different scale. Further, in the following description, a direction in which a metal portion 3 extends is referred to as a Y direction, and a direction in which a plurality of the metal portions 3 are arranged in parallel is referred to as an X direction.

First Configuration Example of Display Device

FIG. 1 is an explanatory diagram schematically illustrating an aspect of a first configuration example of a display device according to the present disclosure. As illustrated in FIG. 1, a display device 100 to which the present disclosure is applied includes a light source unit 11, a light guide 15 on which light emitted from the light source unit 11 is incident, a liquid crystal panel 10 that modulates light emitted from the light guide 15, and a reflective polarizing element 1 provided between the light guide 15 and the liquid crystal panel 10. The light source unit 11, the light guide 15, and the reflective polarizing element 1 configure an illumination device 110. Furthermore, the display device 100 includes a polarizing element 18 on an opposite side from the illumination device 110 with respect to the liquid crystal panel 10.

The light guide 15 is a so-called light tunnel and has a shape in which a diameter of a wall surface 150 is continuously expanded from an incidence portion 151 toward an emission portion 152 in order to make a brightness distribution of light uniform at the emission portion 152. Thus, a luminous flux angle of light incident from the incidence portion 151 is gradually aligned while the light is being reflected by the wall surface 150 of the light guide 15, and the luminous flux is eventually aligned in a direction substantially perpendicular to the emission portion 152.

In a present exemplary embodiment, the liquid crystal panel 10 is a transmissive color liquid crystal panel including a color filter, and the light source unit 11 emits white light. The white light emitted from the light source unit 11 is incident on the interior of the light guide 15 via the incidence portion 151 of the light guide 15, and is then emitted from the emission portion 152 while being reflected by the wall surface 150 of the light guide 15.

In the present exemplary embodiment, the light source unit 11 includes a light source 12 and an optical element 13. The light source 12 is, for example, a light emitting element such as a light emitting diode that emits light of a first wavelength. The optical element 13 has a structure in which a first functional film, a phosphor-containing member, and a second functional film are layered in this order from the light source 12 toward the light guide 15, for example. The first functional film transmits the light of the first wavelength and reflects light of a second wavelength. The phosphor-containing member is excited by the light of the first wavelength and emits the light of the second wavelength. The second functional film transmits the light of the second wavelength and reflects the light of the first wavelength. Therefore, the light emitted from the light source unit 11 is the light of the second wavelength. In the present exemplary embodiment, the light of the first wavelength is ultraviolet light, and the light of the second wavelength emitted from the light source unit 11 is white light.

In the display device 100 configured as described above, the reflective polarizing element 1 faces the emission portion 152 of the light guide 15. Thus, since, of the light emitted from the light guide 15, light of a first polarization component is transmitted and light of a second polarization component having a different polarization direction from that of the light of the first polarization component is reflected, the light of the first polarization component is incident on the liquid crystal panel 10. Thus, the liquid crystal panel 10 modulates the light of the first polarization component, and the polarizing element 18 transmits the light of the second polarization component, for example. As a result, the display device 100 displays a color image as a direct view display device.

In the display device 100 and the illumination device 110 described above, when the light of the second polarization component is reflected by the reflective polarizing element 1, the polarization direction rotates. Thus, part of the light of the second polarization component reflected by the reflective polarizing element 1 becomes the light of the first polarization component, is reflected once again inside the light guide 15, is guided toward the reflective polarizing element 1, and is transmitted through the reflective polarizing element 1. Thus, by repeating the operation described above, the polarization direction of the light emitted from the light guide 15 can be aligned. Furthermore, by employing a configuration to be described below in the reflective polarizing element 1, the light utilization efficiency can be improved by increasing both a transmittance (Tp) of the light of the first polarization component and a reflectance (Rs) of the second polarization component.

Configuration of Reflective Polarizing Element 1

Figure 2:
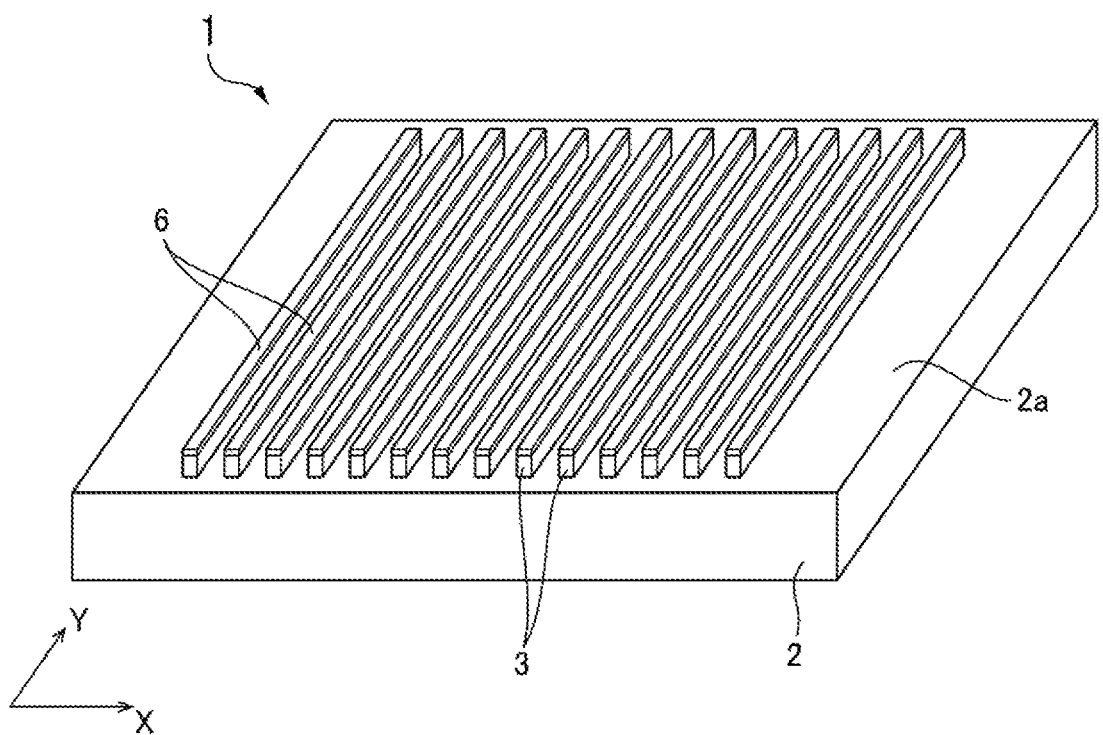
FIG. 2 is an explanatory diagram illustrating an aspect of a reflective polarizing element to which the present disclosure is applied.
Figure 3:
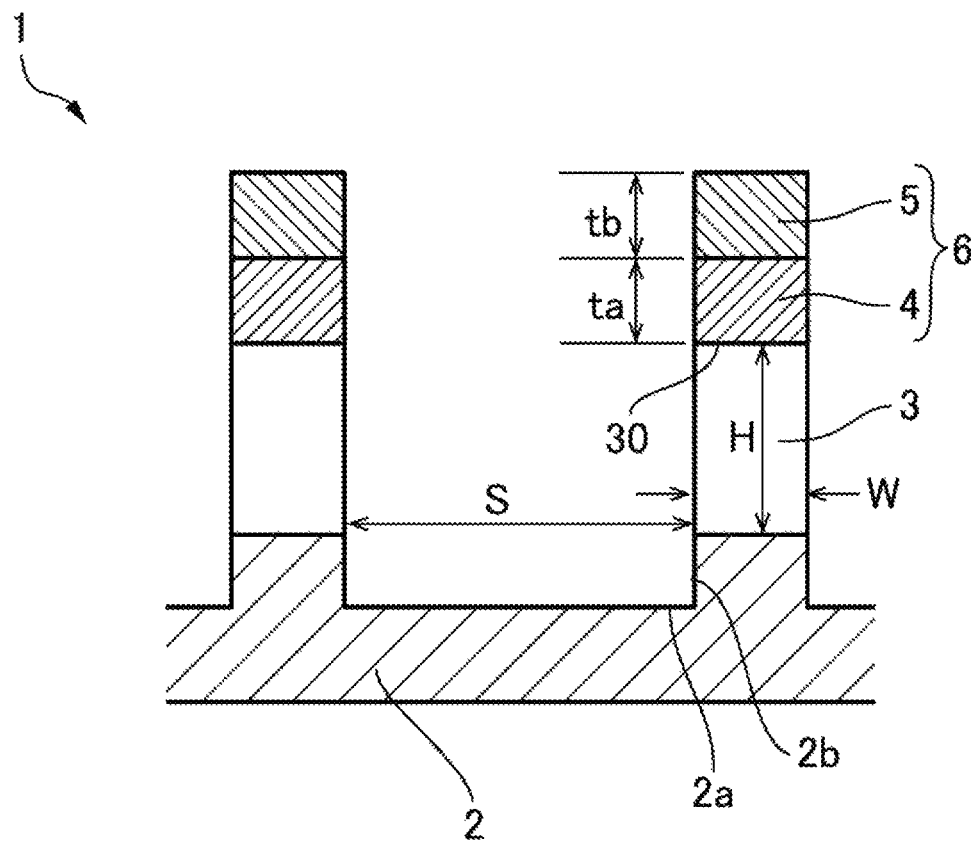
FIG. 3 is a cross-sectional view enlarging and illustrating a metal portion and the like illustrated in FIG. 2.

FIG. 2 is an explanatory diagram illustrating an aspect of the reflective polarizing element 1 to which the present disclosure is applied. FIG. 3 is a cross-sectional view enlarging and illustrating the metal portion 3 and the like illustrated in FIG. 2. The reflective polarizing element 1 illustrated in FIG. 2 and FIG. 3 is used in the display device 100 and the like described above with reference to FIG. 1. As illustrated in FIG. 2 and FIG. 3, the reflective polarizing element 1 is a wire grid reflective polarizing element that includes a light-transmitting substrate 2, and the plurality of metal portions 3 formed on one face 2a of the substrate 2. The plurality of metal portions 3 extend in one direction (the Y direction) at an equal pitch to form a wire grid. In the present exemplary embodiment, the plurality of metal portions 3 are arranged in parallel to each other.

In the reflective polarizing element 1 of the present exemplary embodiment, a reflection enhancing portion 6 is provided on an end portion in the thickness direction of the metal portion 3, and light is incident on the metal portion 3 from a side on which the reflection enhancing portion 6 is provided. Thus, in the display device 100 illustrated in FIG. 1, the reflective polarizing element 1 is disposed such that the side of the metal portion 3 on which the reflection enhancing portion 6 is provided faces the light guide 15. Therefore, light absorption by the reflective polarizing element 1 is small, and the light utilization efficiency can thus be improved. In the present exemplary embodiment, of both end portions in the thickness direction of the metal portion 3, the reflection enhancing portion 6 is provided on the end portion on the opposite side from the substrate 2, and light is incident on the reflection enhancing portion 6 from the opposite side from the substrate 2.

The substrate 2 is a light-transmitting substrate such as a glass substrate, a quartz substrate, or a crystal substrate. The thickness of the substrate 2 is from 0.5 mm to 10 mm, for example. A width W of the metal portion 3 and a space S (an interval between the metal portions 3) are 400 nm or less, for example. In the present exemplary embodiment, the width W of the metal portion 3 and the space S are each from 20 nm to 300 nm, and a thickness H of the metal portion 3 is from 20 nm to 300 nm, for example. From a viewpoint of keeping absorption loss in the metal portion 3 small in a visible light wavelength region, it is preferable that a reflective metal such as aluminum (Al), an alloy containing aluminum as a main component, silver, or an alloy containing silver as a main component be used for the metal portion 3. In the present exemplary embodiment, the metal portion 3 is formed of aluminum. As a result of the substrate 2 being subject to etching when performing patterning of the metal portion 3 and the like, a groove 2b is formed between the metal portions 3 adjacent to each other. Note that in the reflective polarizing element 1, a water resistant film such as a silicon oxide film may be formed on a side surface of the metal portion 3.

In the reflective polarizing element 1 described above, when a pitch of the metal portion 3 is sufficiently smaller than a wavelength of incident light, of the incident light, linearly polarized light of the first polarization component (p-polarized light, TM wave) oscillating in a direction perpendicular to an extending direction of the metal portion 3 is transmitted, and linearly polarized light of the second polarization component (s-polarized light, TE wave) oscillating in the extending direction of the metal portion 3 is reflected. At this time, the polarization direction of the linearly polarized light of the second polarization component rotates.

In the present exemplary embodiment, the reflection enhancing portion 6 includes a low refractive index film 4 provided so as to overlap with an end portion 30 of the metal portion 3, and a high refractive index film 5 provided on an opposite side of the low refractive index film 4 from the metal portion 3. Here, "low refractive index" and "high refractive index" indicate a relative magnitude relationship between refractive indexes of the low refractive index film 4 and the high refractive index film 5, and the high refractive index film 5 has a greater refractive index than the low refractive index film 4.

Detailed Configuration of Reflective Polarizing Element 1

Figure 4:
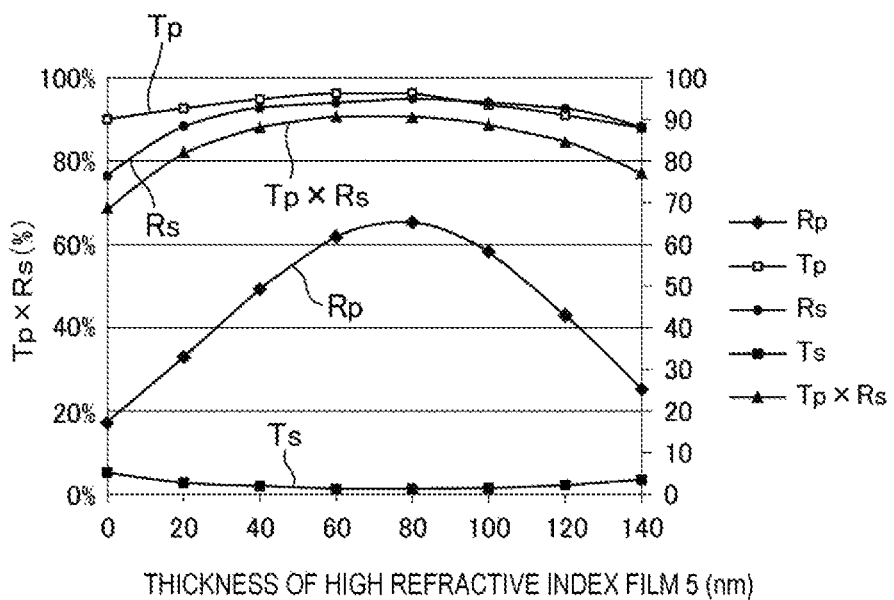
FIG. 4 is an explanatory diagram showing relationships between a configuration of a reflection enhancing portion of the reflective polarizing element illustrated in FIG. 3 and optical characteristics.
Figure 18A:
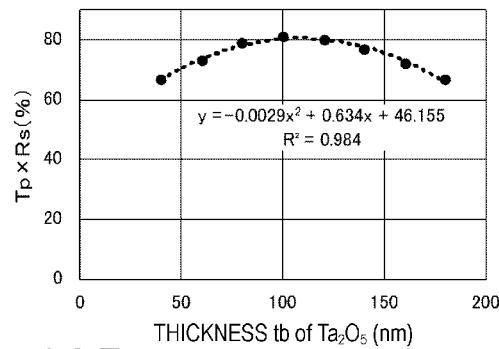
FIGS. 18A to 18D are graphs each showing a relationship between the thickness of $Ta_2O_5$ and the product Tp×Rs when the thickness of the metal portion is 100 nm and the width thereof is 60 nm, among the results shown in FIG. 8.
Figure 18B:
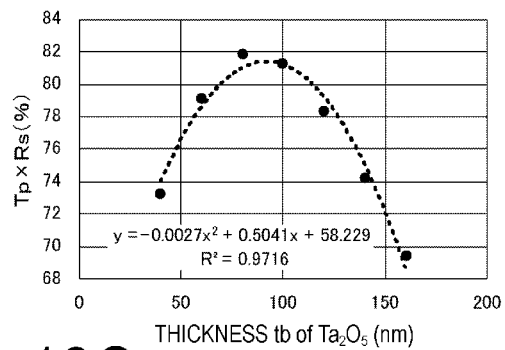
Figure 18C:
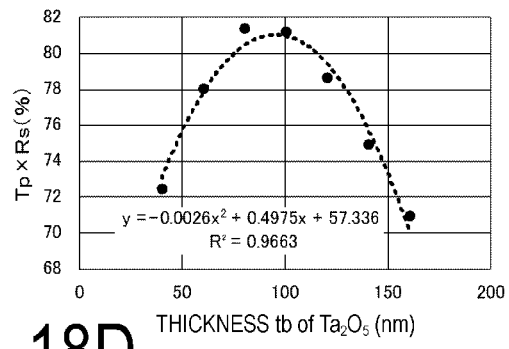
Figure 18D:
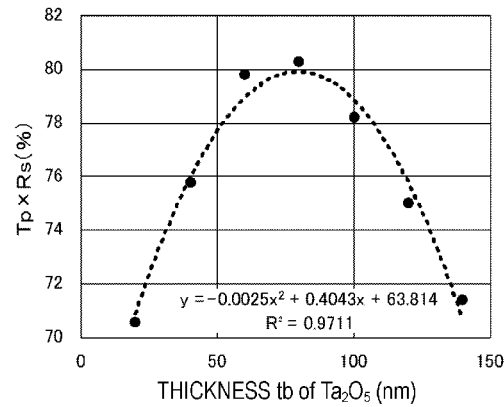

In the description below, the linearly polarized light of the first polarization component will be referred to as the p-polarized light, and the linearly polarized light of the second polarization component will be referred to as the s-polarized light. FIG. 4 is an explanatory diagram showing relationships between a configuration of the reflection enhancing portion 6 of the reflective polarizing element 1 illustrated in FIG. 3 and optical characteristics. As the optical characteristics, FIG. 4 shows a reflectance Rp of the p-polarized light, the transmittance Tp of the p-polarized light, the reflectance Rs of the s-polarized light, and a transmittance Ts of the s-polarized light. Furthermore, FIG. 4 shows the light utilization efficiency, which is defined by a product (Tp×Rs) of the transmittance Tp of the p-polarized light and the reflectance Rs of the s-polarized light.

In the reflective polarizing element 1 illustrated in FIG. 3, when the thickness H of the metal portion 3 and a thickness to of the low refractive index film 4 are kept constant, and a thickness tb of the high refractive index film 5 is changed, as shown in FIG. 4, the reflectance Rp of the p-polarized light, the transmittance Tp of the p-polarized light, the reflectance Rs of the s-polarized light, and the transmittance Ts of the s-polarized light change. In the present exemplary embodiment, both the transmittance Tp of the p-polarized light and the reflectance Rs of the s-polarized light are preferably high, so, for example, it is preferable that the product (Tp×Rs) of the transmittance Tp of the p-polarized light and the reflectance Rs of the s-polarized light be high. For example, in the present exemplary embodiment, the light utilization efficiency is defined by the product of the transmittance Tp of the linearly polarized light of the first polarization component (the p-polarized light) that oscillates in another direction perpendicular to the one direction in which the metal portion 3 extends and the reflectance of the linearly polarized light of the second polarization component (the s-polarized light) that oscillates in the one direction, and it is preferable that the light utilization efficiency be 80% or greater.

However, since the reflection enhancing portion 6 provided in the reflective polarizing element 1 behaves differently from a normal reflection enhancing film provided in a lens and the like, optimum conditions for the reflection enhancing portion 6 provided in the reflective polarizing element 1 are significantly different from optimum conditions for the normal reflection enhancing film provided in the lens and the like. Thus, the present inventors have investigated conditions for obtaining the reflective polarizing element 1 in which the product (Tp×Rs) of the transmittance Tp of the p-polarized light and the reflectance Rs of the s-polarized light is high, and results of the investigation will be described below with reference to FIG. 5 to FIG. 28.

In the investigation to be described below, the following conditions were selected for the metal portion 3, the low refractive index film 4, and the high refractive index film 5. A pitch P of the metal portion 3 is 140 nm. Note that values of the transmittance Tp of the p-polarized light, the reflectance Rs of the s-polarized light, and a refractive index n are values obtained when the wavelength is set to 540 nm.
Metal portion 3
Material=Aluminum (Al)
Thickness=50 nm to 250 nm
Width=40 nm and 60 nm
Low refractive index film 4
Material=Silicon oxide film ($SiO_2$)
Refractive index n=1.46
Thickness=20 nm to 200 nm
High refractive index film 5
Material=Titanium oxide film ($TiO_2$)
Refractive index n=2.66
Material=Tantalum oxide film ($Ta_2O_5$)
Refractive index n=2.14
Thickness=20 nm to 180 nm Investigation Results 1 of Reflective Polarizing Element 1

First, simulation results of the product Tp×Rs when the configuration of each of the metal portion 3 and the reflection enhancing portion 6 of the reflective polarizing element 1 is changed are shown in FIG. 5 to FIG. 8.

FIG. 5 is an explanatory diagram showing values of the product Tp×Rs when the width W of the metal portion 3 illustrated in FIG. 3 is 40 nm and the high refractive index film 5 is $TiO_2$. FIG. 6 is an explanatory diagram showing values of the product Tp×Rs when the width W of the metal portion 3 illustrated in FIG. 3 is 60 nm and the high refractive index film 5 is $TiO_2$. FIG. 7 is an explanatory diagram showing values of the product Tp×Rs when the width W of the metal portion 3 illustrated in FIG. 3 is 40 nm and the high refractive index film 5 is $Ta_2O_5$. FIG. 8 is an explanatory diagram showing values of the product Tp×Rs when the width W of the metal portion 3 illustrated in FIG. 3 is 60 nm and the high refractive index film 5 is $Ta_2O_5$. Note that in FIG. 5 to FIG. 8, the values of the product Tp×Rs are shown when the thickness H of the metal portion 3, the thickness ta of the low refractive index film 4, and the thickness tb of the high refractive index film 5 are changed. However, in this investigation, a condition range in which the product Tp×Rs has a relatively high value has been mainly investigated, and results of the investigation are shown in FIG. 5 to FIG. 8. Note that the values of the product Tp×Rs shown in FIG. 5 to FIG. 8 are values before being multiplied by 100 and converted to %.

As shown in FIG. 5 to FIG. 8, it is understood that the product Tp×Rs changes when any one of the thickness H of the metal portion 3, the width W of the metal portion 3, the thickness ta of the low refractive index film 4, the material of the high refractive index film 5, and the thickness tb of the high refractive index film 5 changes.

Investigation Results 2 of Reflective Polarizing Element 1

Next, based on the results shown in FIG. 5 to FIG. 8, the thickness tb of the high refractive index film 5 at which the product Tp×Rs reaches its peak has been investigated, and results of the investigation are shown in FIG. 9A to FIG. 22.

FIGS. 9A to 9G are graphs each showing a relationship between the thickness tb of $TiO_2$ and the product Tp×Rs when the thickness H of the metal portion 3 is 50 nm and the width W thereof is 40 nm, among the results shown in FIG. 5. FIGS. 10A to 10G are graphs each showing a relationship between the thickness tb of $TiO_2$ and the product Tp×Rs when the thickness H of the metal portion 3 is 100 nm and the width W thereof is 40 nm, among the results shown in FIG. 5. FIGS. 11A to 11F are graphs each showing a relationship between the thickness tb of $TiO_2$ and the product Tp×Rs when the thickness H of the metal portion 3 is 150 nm and the width thereof is 40 nm, among the results shown in FIG. 5. FIGS. 12A to 12E are graphs each showing a relationship between the thickness tb of $TiO_2$ and the product Tp×Rs when the thickness H of the metal portion 3 is 200 nm and the width thereof is 40 nm, among the results shown in FIG. 5.

FIGS. 13A to 13F are graphs each showing a relationship between the thickness tb of $TiO_2$ and the product Tp×Rs when the thickness H of the metal portion 3 is 50 nm and the width thereof is 60 nm, among the results shown in FIG. 6. FIGS. 14A to 14E are graphs each showing a relationship between the thickness tb of $TiO_2$ and the product Tp×Rs when the thickness H of the metal portion 3 is 100 nm and the width thereof is 60 nm, among the results shown in FIG. 6.

FIGS. 15A to 15G are graphs each showing a relationship between the thickness tb of $Ta_2O_5$ and the product Tp×Rs when the thickness H of the metal portion 3 is 100 nm and the width thereof is 40 nm, among the results shown in FIG. 7. FIGS. 16A to 15E are graphs each showing a relationship between the thickness tb of $Ta_2O_5$ and the product Tp×Rs when the thickness H of the metal portion 3 is 150 nm and the width thereof is 40 nm, among the results shown in FIG. 7.

FIGS. 17A to 17G are graphs each showing a relationship between the thickness tb of $Ta_2O_5$ and the product Tp×Rs when the thickness H of the metal portion 3 is 50 nm and the width thereof is 60 nm, among the results shown in FIG. 8. FIGS. 18A to 18D are graphs each showing a relationship between the thickness tb of $Ta_2O_5$ and the product Tp×Rs when the thickness H of the metal portion 3 is 100 nm and the width thereof is 60 nm, among the results shown in FIG. 8.

FIG. 19 is an explanatory diagram showing optimum thicknesses tb0 of the high refractive index film 5 and the like when the width W of the metal portion 3 illustrated in FIG. 3 is 40 nm and the high refractive index film 5 is $TiO_2$. FIG. 20 is an explanatory diagram showing the optimum thicknesses tb0 of the high refractive index film 5 and the like when the width W of the metal portion 3 illustrated in FIG. 3 is 60 nm and the high refractive index film 5 is $TiO_2$. FIG. 21 is an explanatory diagram showing the optimum thicknesses tb0 of the high refractive index film 5 and the like when the width W of the metal portion 3 illustrated in FIG. 3 is 40 nm and the high refractive index film 5 is $Ta_2O_5$. FIG. 22 is an explanatory diagram showing the optimum thicknesses tb0 of the high refractive index film 5 and the like when the width W of the metal portion 3 illustrated in FIG. 3 is 60 nm and the high refractive index film 5 is $Ta_2O_5$.

When the relationship between the thickness tb of the high index film 5 ($TiO_2$, $Ta_2O_5$) and the product Tp×Rs according to each of the conditions is graphically illustrated based on the results shown in FIG. 5 to FIG. 8, it is understood that the product Tp×Rs reaches its peak when the high index film 5 ($TiO_2$, $Ta_2O_5$) has a predetermined thickness (the optimum thickness tb0), as shown in FIG. 9A to FIG. 18D.

Here, changes in the vicinity of the peak are approximated by the following quadratic function having the thickness tb of the high refractive index film 5 as a variable, where coefficients a, b, and c of the approximate expression are shown in FIG. 19 to FIG. 22.

$y = ax_2 + bx + c$ $y$ = Product $Tp \times Rs$ $x$ = Thickness $tb$ of high index film 5

Since the optimum thickness tb0 of the high refractive index film 5 at which the product Tp×Rs reaches the maximum value is $-b/2a$ in the above-described equation, the optimum thickness tb0 of the high refractive index film 5 at which the product Tp×Rs reaches its peak can be determined. Thus, those values are shown in FIG. 19 to FIG. 22.

Furthermore, since a lower limit value tb1 and an upper limit value tb2 of the high refractive index film 5 when y=80% (product Tp×Rs) or greater can be determined according to the above-described equation, those values are shown in FIG. 19 to FIG. 22. Note that depending on the conditions, the product Tp×Rs may not be 80% or greater.

Investigation Results 3 of Reflective Polarizing Element 1

Next, when the optimum thicknesses tb0 of the high refractive index film 5, the lower limit values tb1 of the high refractive index film 5, and the upper limit values tb2 of the high refractive index film 5 that are obtained when the product Tp×Rs reaches its peak, which are shown in FIG. 19 to FIG. 22, are graphically illustrated when the thickness ta of the low refractive index film 4 is a variable, results illustrated in FIG. 23A to FIG. 26B and the like are obtained.

FIGS. 23A to 23C are graphs each showing changes in the optimum thickness tb0 of $TiO_2$ and the like when the width W of the metal portion 3 illustrated in FIG. 3 is 40 nm. FIGS. 24A and 24B are graphs each showing changes in the optimum thickness tb0 of $TiO_2$ and the like when the width W of the metal portion 3 illustrated in FIG. 3 is 60 nm. FIGS. 25A and 25B are graphs each showing changes in the optimum thickness tb0 of $Ta_2O_5$ and the like when the width W of the metal portion 3 illustrated in FIG. 3 is 40 nm. FIGS. 26A and 26B are graphs each showing changes in the optimum thickness tb0 of $Ta_2O_5$ and the like when the width W of the metal portion 3 illustrated in FIG. 3 is 60 nm.

As shown in FIG. 23A to FIG. 26B, the optimum thickness tb0 of the high refractive index film 5, the lower limit value tb1 of the high refractive index film 5, and the upper limit value tb2 of the high refractive index film 5, which are obtained when the product Tp and Rs reaches its peak, can each be expressed by the following approximate expression of a linear function having the thickness tb of the low refractive index film 4 as a variable. Here, coefficients a and b are variables of the thickness H of the metal portion 3.

$$y=ax+b$$

$y$=Thickness $tb$ of high refractive index film 5

$x$=Thickness $ta$ of low refractive index film 4

Coefficients $a$ and $b$=Variables of thickness $H$ of metal portion 3

Investigation Results 4 of Reflective Polarizing Element 1

FIGS. 27A to 27C are explanatory diagrams each showing a method for determining the coefficients in the approximate expression of the optimum thickness tb0, the lower limit value tb1, and the upper limit value tb2 of the high refractive index film 5 illustrated in FIG. 3.

According to the results described above, it is sufficient that the optimum thickness tb0 of the high refractive index film 5, the lower limit value tb1 of the high refractive index film 5, and the upper limit value tb2 of the high refractive index film 5 each be expressed as the approximate expression having the low refractive index film 4 as a variable with reference to specific conditions, and that an influence of a parameter changed from the specific conditions be corrected. As a result, over a wide range including the specific conditions, the optimum thickness tb0 of the high refractive index film 5, the lower limit value tb1 of the high refractive index film 5, and the upper limit value tb2 of the high refractive index film 5 can each be expressed as a general equation having the thickness ta of the low refractive index film 4 as a variable.

More specifically, with reference to the following conditions illustrated in FIGS. 23A to 23C, the optimum thickness tb0 of the high refractive index film 5, the lower limit value tb1 of the high refractive index film 5, and the upper limit value tb2 of the high refractive index film 5 are each expressed by the approximate expression of the linear function having the thickness ta of the low refractive index film 4 as a variable, and an influence of a parameter changed from the specific conditions is corrected.

Basic conditions
Width of metal portion 3 (Al)=40 nm
Material of high refractive index film 5=TiO$_2$
Approximate expression under basic conditions $$y=ax+b$$

x=Thickness ta of low refractive index film 4 (SiO$_2$)
Coefficients a and b=Variables of thickness H of metal portion 3

More specifically, in FIGS. 23A to 23C, in each of the approximate expressions of the optimum thickness tb0 of the high refractive index film 5, the lower limit value tb1 of the high refractive index film 5, and the upper limit value tb2 of the high refractive index film 5, the coefficients a and b are variables of the thickness H of the metal portion 3 (Al), as shown in a table of the coefficients in FIG. 27A. Furthermore, in the basic conditions, the coefficients a and b in each of the approximate expressions can be approximated by the following linear function, as shown in a graph of the coefficient a in FIG. 27B and a graph of the coefficient b in FIG. 27C.

Approximate expression 1 for optimum thickness tb0 of high refractive index film 5

$$tb0 = A0 \times ta + B0$$

$$A0 = -0.0022H - 0.3078$$

$$B0 = 0.0461H + 103.94$$

Approximate expression 2 for lower limit value tb1 of high refractive index film 5

$$tb1 = A1 \times ta + B1$$

$$A1 = -0.0002H - 0.4625$$

$$B1 = -0.2534H + 90.28$$

Approximate expression 3 for upper limit value tb2 of high refractive index film 5

$$tb2 = A2 \times ta + B2$$

$$A2 = -0.0046H - 0.1532$$

$$B2 = 0.3456H + 117.6$$

Optimization Conditions 1 for Thickness of High Refractive Index Film 5 in Reflective Polarizing Element 1

From the results described above, for the reflective polarizing element 1, the product Tp×Rs can be set to a high value by setting the thickness tb of the high refractive index film 5 to be within a range of a certain width with respect to the approximate expression 1 of the optimum thickness tb0. For example, based on the characteristics shown in FIG. 23A to FIG. 26B, when the thickness tb of the high refractive index film 5 is set to be in a range of ±30 nm with respect to the optimum thickness tb0 determined by the approximate expression 1, the product Tp×Rs can be set to a high value. Note that when the thickness tb of the high refractive index film 5 is set to be in a range of ±20 nm with respect to the optimum thickness tb0 determined by the approximate expression 1, the product Tp×Rs can be set to an even higher value.

Furthermore, since the width of the metal portion 3 (Al) is 40 nm under the basic conditions, when W nm is changed, a conditional expression needs to be changed. In the present exemplary embodiment, based on comparison results between the characteristics shown in FIG. 23A to FIG. 23C and the characteristics shown in FIG. 24A and FIG. 24B, and comparison results between the characteristics shown in FIG. 25A and FIG. 25B and the characteristics shown in FIG. 26A and FIG. 26B, when the width of the metal portion 3 is changed from 40 nm to W nm, an amount corresponding to (W−40) nm is subtracted from the thickness determined by the approximate expression. According to this correction, even when the width of the metal portion 3 (Al) is other than 40 nm, the high refractive index film 5 can be set to an appropriate thickness based on the approximate expression.

Furthermore, since the material of the high refractive index film 5 is TiO$_2$ having the refractive index of 2.66 under the basic conditions, when the material is changed, the conditional equation needs to be changed. In the present exemplary embodiment, based on comparison results between the characteristics shown in FIGS. 23A to 23C and the characteristics shown in FIGS. 25A and 25B and comparison results between the characteristics shown in FIGS. 24A and 24B and the characteristics shown in FIGS. 26A and 26B, when the material of the high refractive index film 5 is changed, the thickness determined by the approximate expression is multiplied by (2.66/n) to obtain a value. According to this correction, even when the material of the high refractive index film 5 is other than $TiO_2$, the high refractive index film 5 can be set to an appropriate thickness based on the approximate expression.

In other words, when the thickness of the metal portion 3 is H nm, the width of the metal portion 3 is W nm, the refractive index of the high refractive index film 5 is n, the thickness of the low refractive index film 4 is ta, and the thickness of the high refractive index film 5 is tb, if the thickness tb of the high refractive index film 5 is set to satisfy both of the following conditional equations (a1) and (b1):

$$[(A0 \times ta + B0) \times (2.66/n) - (W-40)] - 30 \text{ nm} \leq tb, \quad \text{expression (a1) and}$$

$$[(A0 \times ta + B0) \times (2.66/n) - (W-40)] + 30 \text{ nm} \geq tb \quad \text{conditional expression (b1)}$$

provided that, in the conditional expressions (a1) and (b1) described above, $$A0 = -0.0022H - 0.3078$$

$$B0 = 0.0461H + 103.94$$

$$tb > 0$$

the reflective polarizing element 1 having a high product Tp×Rs can be realized. Note that when the thickness of the high refractive index film 5 is too thin, reliability of the approximate expression tends to decrease, so the thickness tb of the high refractive index film 5 is preferably 5 nm or greater.

Optimization Conditions 2 for Thickness of High Refractive Index Film 5 in Reflective Polarizing Element 1

FIG. 28 is an explanatory diagram for verifying optimization conditions 2 based on the approximate expression.

From the results described above, with respect to the reflective polarizing element 1, when the thickness of the high refractive index film 5 is set to a value between the lower limit value tb1 and the upper limit value tb2, the product Tp×Rs can be set to a high value.

In this case as well, since the width of the metal portion 3 (Al) is 40 nm under the basic conditions, when W nm is changed, the conditional expression needs to be changed. In the present exemplary embodiment, based on comparison results between the characteristics shown in FIG. 23A to FIG. 23C and the characteristics shown in FIG. 24A and FIG. 24B, and comparison results between the characteristics shown in FIG. 25A and FIG. 25B and the characteristics shown in FIG. 26A and FIG. 26B, when the width of the metal portion 3 is changed from 40 nm to W nm, an amount corresponding to (W-40) nm is subtracted from the thickness determined by the approximate expression. According to this correction, even when the width of the metal portion 3 (Al) is other than 40 nm, the high refractive index film 5 can be set to an appropriate thickness based on the approximate expression.

Furthermore, since the material of the high refractive index film 5 is $TiO_2$ having the refractive index of 2.66 under the basic conditions, when the material is changed, the conditional expression needs to be changed. In the present exemplary embodiment, based on comparison results between the characteristics shown in FIGS. 23A to 23C and the characteristics shown in FIGS. 25A and 25B and comparison results between the characteristics shown in FIGS. 24A and 24B and the characteristics shown in FIGS. 26A and 26B, when the material of the high refractive index film 5 is changed, the thickness determined by the approximate expression is multiplied by (2.66/n) to obtain a value. According to this correction, even when the material of the high refractive index film 5 is not $TiO_2$, the high refractive index film 5 can be set to an appropriate thickness based on the approximate expression.

In other words, when the thickness of the metal portion 3 is H nm, the width of the metal section 3 is W nm, the refractive index of the high refractive index film 5 is n, the thickness of the low refractive index film 4 is ta, and the thickness of the high refractive index film 5 is tb, the reflective polarizing element 1 having a high product Tp×Rs can be realized when the thickness of the high refractive index film 5 is set to satisfy both of the following conditional expressions (a2) and (b2):

$$[(A1 \times ta + B1) \times (2.66/n) - (W-40)] \leq tb \quad \text{conditional expression (a2)}$$

provided that, in the above-described conditional expression (a2), $$A1 = -0.0002H - 0.4625$$

$$B1 = -0.2534H + 90.28$$

$$tb > 0, \text{ and}$$

$$[(A2 \times ta + B2) \times (2.66/n) - (W-40)] \geq tb \quad \text{conditional expression (b2)}$$

provided that, in the above-described conditional expression (b2), $$A2 = -0.0046H - 0.1532$$

$$B2 = 0.3456H + 117.6.$$

Note that when the thickness of the high refractive index film 5 is too thin, reliability of the approximate expression tends to decrease, so the thickness tb of the high refractive index film 5 is preferably 5 nm or greater.

With respect to the conditional expressions (a2) and (b2) described above, for verification, as shown in FIG. 28, the lower limit value tb1 and the upper limit value tb2 were determined for each of cases in which the basic conditions were applied (i), the width of the metal portion 3 was set to 60 nm and the correction of (W-40) nm was performed (ii), $Ta_2O_5$ having the refractive index of 2.14 was used as the high refractive index film 5 and the correction of (2.66/n) was performed (iii), and the correction of (W-40) nm and the correction of (2.66/n) were performed (iv). Specifically, in the case in which the width of the metal portion 3 was set to 60 nm (ii), (W-40)=20 nm was subtracted from each of calculation results under the basic conditions (i). In the case in which $Ta_2O_5$ having the refractive index of 2.14 was used as the high refractive index film 5 (iii), each of the calculation results under the basic conditions (i) was multiplied by 2.14. In the case in which the width of the metal portion 3 was set to 60 nm and $Ta_2O_5$ having the refractive index of 2.14 was used as the high refractive index film 5 (iv), each of the calculation results under the basic conditions (i) was multiplied by 2.14, and then 20 nm was subtracted therefrom.

When the results shown in FIG. 28 are compared with the graphs shown in FIG. 9 and the like, it is understood that the conditional expressions (a2) and (b2) are appropriate, since a condition range in which the product Tp×Rs is 80% can be included. In addition, even when there is no condition in which the product Tp×Rs is 80%, according to the conditional expressions (a2) and (b2), a condition range in which the product Tp×Rs is relatively high can be set.

Second Configuration Example of Display Device

Figure 29:
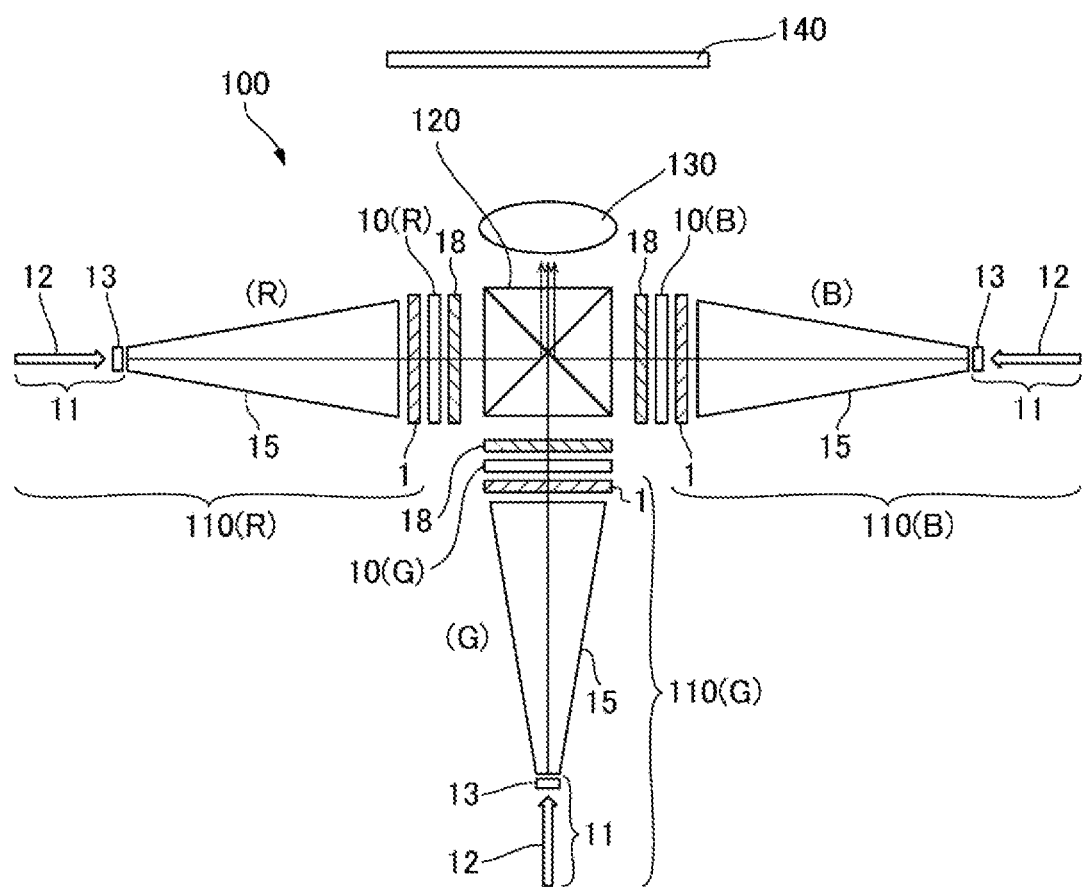
FIG. 29 is an explanatory diagram schematically illustrating an aspect of a second configuration example of the display device according to the present disclosure.

FIG. 29 is an explanatory diagram schematically illustrating an aspect of a second configuration example of the display device according to the present disclosure. As illustrated in FIG. 29, the display device 100 to which the present disclosure is applied is provided with a liquid crystal panel 10(R) corresponding to red light (R), a liquid crystal panel 10(G) corresponding to green light (G), and a liquid crystal panel 10(B) corresponding to blue light (B), and illumination devices 110(R), 110(G), and 110(B), each including the light source unit 11, the light guide 15, and the reflective polarizing element 1, are provided in the liquid crystal panels 10(R), 10(G), and 10(B), respectively. Accordingly, the illumination device 110(R) emits the red light (R) to the liquid crystal panel 10(R), the illumination device 110(G) emits the green light (G) to the liquid crystal panel 10(G), and the illumination device 110(B) emits the green light (B) to the liquid crystal panel 10(B).

Modulated light emitted from each of the liquid crystal panels 10(R), 10(G), and 10(B) is synthesized by an optical path synthesizing element 120 formed of a dichroic prism, and then projected onto a projection member 140, such as a screen, by a projection optical system 130.

In such a configuration, the light source 12 itself may emit a predetermined color light, and in this case, the optical element 13 may be a mode or the like formed of a lens or the like.

Third Configuration Example of Display Device

Figure 30:
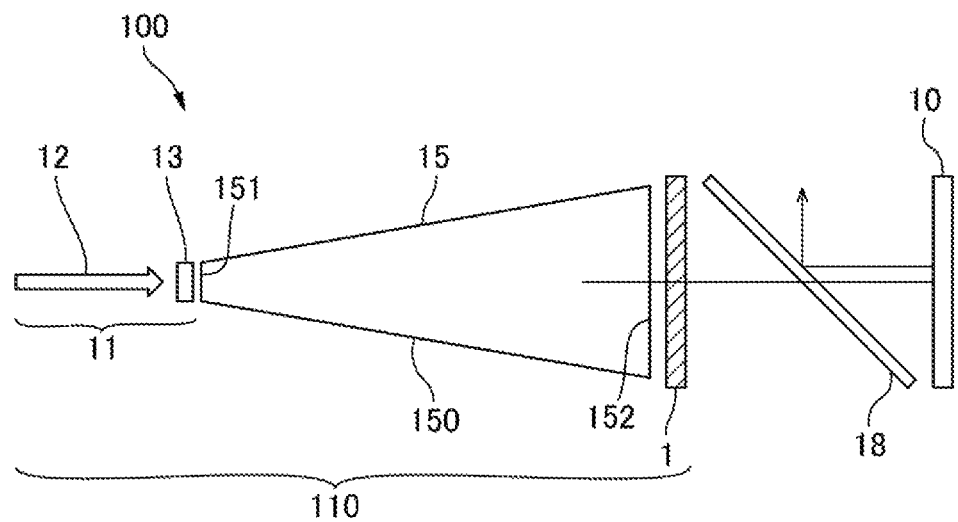
FIG. 30 is an explanatory diagram schematically illustrating an aspect of a third configuration example of the display device according to the present disclosure.

FIG. 30 is an explanatory diagram schematically illustrating an aspect of a third configuration example of the display device according to the present disclosure. In the display device 100 illustrated in FIG. 1, the liquid crystal panel 10 is the transmissive panel, but as illustrated in FIG. 30, the liquid crystal panel 10 may be a reflective panel. In this case, the polarizing element 18 is disposed obliquely between the illumination device 110 and the liquid crystal panel 10.

Note that when the liquid crystal panel 10 is the reflective panel, as illustrated in FIG. 29, the liquid crystal panel 10 and the illumination device 110 may be provided for each color light to configure a projection-type display device.

Other Exemplary Embodiments

In the exemplary embodiment described above, of both the end portions in the thickness direction of the metal portion 3, the reflection enhancing portion 6 is provided on the end portion 30 of the metal portion 3 on the opposite side from the substrate 2. However, as long as a structure is adopted in which the reflection enhancing portion 6 is provided on a light incident side, a mode in which the reflection enhancing portion 6 is provided on the end portion 30 of the metal portion 3 on the substrate 2 side may also be adopted.

An electronic apparatus including the polarizing element 1 to which the present disclosure is applied is not limited to the projection-type display apparatus of the above-described exemplary embodiments. Examples of the electronic apparatus may include a projection-type head up display (HUD), a direct-view-type head mounted display (HMD), a personal computer, a digital still camera, and a liquid crystal television.

What is claimed is:

1. A display device comprising:
   a light source unit;
   a light guide on which light emitted from the light source unit is incident;
   a liquid crystal panel configured to modulate light emitted from the light guide; and
   a reflective polarizing element provided between the light guide and the liquid crystal panel, wherein
   the reflective polarizing element includes a reflective metal portion extending in one direction and a reflection enhancing portion provided on a light incident side of the metal portion,
   the reflection enhancing portion includes a low refractive index film, and a high refractive index film provided on an opposite side of the low refractive index film from the metal portion and having a higher refractive index than a refractive index of the low refractive index film, and
   a thickness of the high refractive index film tb satisfies both conditional expressions (a1) and (b1) described below:

$$[(A0 \times ta + B0) \times (2.66/n) - (W-40)] - 30 \text{ nm} \leq tb, \quad \text{conditional expression (a1) and}$$

$$[(A0 \times ta + B0) \times (2.66/n) - (W-40)] + 30 \text{ nm} \geq tb \quad \text{conditional expression (b1)}$$

provided that, in the conditional expressions (a1) and (b1) described above, $$A0 = -0.0022H - 0.3078$$

$$B0 = 0.0461H + 103.94$$

$$tb > 0$$

where a thickness of the metal portion is H nm, a width of the metal portion is W nm, a refractive index of the high refractive index film is n, a thickness of the low refractive index film is ta, and the thickness of the high refractive index film is tb.

2. The display device according to claim 1, wherein the reflective polarizing element is disposed such that a side of the reflective polarizing element, on which the reflection enhancing portion is provided, faces an emission portion of the light guide.

3. The display device according to claim 1, wherein the liquid crystal panel is provided for each of a plurality of colors,
   an illumination device including the light source unit, the light guide, and the reflective polarizing element is provided for each of the plurality of colors, and
   each of modulated light emitted from the liquid crystal panel for each of the plurality of colors is synthesized by an optical path synthesizing element.

4. The display device according to claim 1, wherein
a thickness of the high refractive index film tb satisfies both conditional expressions (a2) and (b2) described below:

$$[(A1 \times ta + B1) \times (2.66/n) - (W-40)] \leq tb \quad \text{conditional expression (a2)}$$

provided that, in the conditional expression (a2) described above, $$A1 = -0.0002H - 0.4625$$

$$B1 = -0.2534H + 90.28$$

$$tb > 0, \text{ and}$$

$$[(A2 \times ta + B2) \times (2.66/n) - (W-40)] \geq tb \quad \text{conditional expression (b2)}$$

provided that, in the conditional expression (b2) described above, $$A2 = -0.0046H - 0.1532$$

$$B2 = 0.3456H + 117.6$$

where a thickness of the metal portion is H nm, a width of the metal portion is W nm, a refractive index of the high refractive index film is n, a thickness of the low refractive index film is ta, and the thickness of the high refractive index film is tb.

5. The display device according to claim 1, wherein light utilization efficiency is no less than 80%, and the light utilization efficiency is defined by a product of transmittance of a linearly polarized light of a first polarization component oscillating in another direction perpendicular to the one direction, and reflectance of a linearly polarized light of a second polarization component oscillating in the one direction.

6. A reflective polarizing element comprising:
a reflective metal portion extending in one direction; and
a reflection enhancing portion provided on a light incident side of the metal portion, wherein
the reflection enhancing portion includes a low refractive index film, and a high refractive index film provided on an opposite side of the low refractive index film from the metal portion and having a higher refractive index than a refractive index of the low refractive index film, and
a thickness of the high refractive index film tb satisfies both conditional expressions (a1) and (b1) described below:

$$[(A0 \times ta + B0) \times (2.66/n) - (W-40)] - 30 \text{ nm} \leq tb, \quad \text{conditional expression (a1) and}$$

$$[(A0 \times ta + B0) \times (2.66/n) - (W-40)] + 30 \text{ nm} \geq tb \quad \text{conditional expression (b1)}$$

provided that, in the conditional expressions (a1) and (b1) described above, $$A0 = -0.0022H - 0.3078$$

$$B0 = 0.0461H + 103.94$$

$$tb > 0$$

where a thickness of the metal portion is H nm, a width of the metal portion is W nm, a refractive index of the high refractive index film is n, a thickness of the low refractive index film is ta, and the thickness of the high refractive index film is tb.

7. The reflective polarizing element according to claim 6, wherein
light utilization efficiency is no less than 80%, and the light utilization efficiency is defined by a product of transmittance of a linearly polarized light of a first polarization component oscillating in another direction perpendicular to the one direction, and reflectance of a linearly polarized light of a second polarization component oscillating in the one direction.

8. A reflective polarizing element comprising:
a reflective metal portion extending in one direction; and
a reflection enhancing portion provided on a light incident side of the metal portion, wherein
the reflection enhancing portion includes a low refractive index film and a high refractive index film provided on an opposite side of the low refractive index film from the metal portion and having a higher refractive index than a refractive index of the low refractive index film, and
a thickness of the high refractive index film tb satisfies both conditional expressions (a2) and (b2) described below:

$$[(A1 \times ta + B1) \times (2.66/n) - (W-40)] \leq tb \quad \text{conditional expression (a2)}$$

provided that, in the conditional expression (a2) described above, $$A1 = -0.0002H - 0.4625$$

$$B1 = -0.2534H + 90.28$$

$$tb > 0, \text{ and}$$

$$[(A2 \times ta + B2) \times (2.66/n) - (W-40)] \geq tb \quad \text{conditional expression (b2)}$$

provided that, in the conditional expression (b2) described above, $$A2 = -0.0046H - 0.1532$$

$$B2 = 0.3456H + 117.6$$

where a thickness of the metal portion is H nm, a width of the metal portion is W nm, a refractive index of the high refractive index film is n, a thickness of the low refractive index film is ta, and the thickness of the high refractive index film is tb.

9. A display device comprising:
a light source unit;
a light guide on which light emitted from the light source unit is incident;
a liquid crystal panel configured to modulate light emitted from the light guide; and
a reflective polarizing element provided between the light guide and the liquid crystal panel, wherein
the reflective polarizing element includes a reflective metal portion extending in one direction and a reflection enhancing portion provided on a light incident side of the metal portion,
the reflection enhancing portion includes a low refractive index film, and a high refractive index film provided on an opposite side of the low refractive index film from the metal portion and having a higher refractive index than a refractive index of the low refractive index film, and a thickness of the high refractive index film tb satisfies both conditional expressions (a2) and (b2) described below:

$$[(A1 \times ta + B1) \times (2.66/n) - (W-40)] \leq tb \quad \text{conditional expression (a2)}$$

provided that, in the conditional expression (a2) described above, $$A1 = -0.0002H - 0.4625$$

$$B1 = -0.2534H + 90.28$$

$$tb > 0, \text{ and}$$

$$[(A2 \times ta + B2) \times (2.66/n) - (W-40)] \geq tb \quad \text{conditional expression (b2)}$$

provided that, in the conditional expression (b2) described above, $$A2 = -0.0046H - 0.1532$$

$$B2 = 0.3456H + 117.6$$

where a thickness of the metal portion is H nm, a width of the metal portion is W nm, a refractive index of the high refractive index film is n, a thickness of the low refractive index film is ta, and the thickness of the high refractive index film is tb.

* * * * *